(12) United States Patent
Robb et al.

(10) Patent No.: US 12,545,447 B1
(45) Date of Patent: Feb. 10, 2026

(54) AERIAL VEHICLE LANDING PAD WITH SENSORS

(71) Applicant: Amazon Technologies, Inc., Seattle, WA (US)

(72) Inventors: Larry Joe Robb, Mount Juliet, TN (US); Christopher Semanda Musoke, Cambridge, MA (US); Dianne Anderson, Aubrey, TX (US); Kristina Freismuth, Satellite Beach, FL (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/736,983

(22) Filed: Jun. 7, 2024

(51) Int. Cl.
*B64U 70/90* (2023.01)
*B64U 70/92* (2023.01)
*G01L 5/00* (2006.01)
*B64D 45/00* (2006.01)

(52) U.S. Cl.
CPC ............ *B64U 70/92* (2023.01); *G01L 5/0052* (2013.01); *B64D 2045/008* (2013.01)

(58) Field of Classification Search
CPC ........ B64U 70/92; B64U 80/70; B64U 70/00; B64U 70/93; B64U 70/90; B64U 70/50; B64U 80/20; B64F 1/005; B64C 29/02; G01L 5/0052; B64D 2045/008
See application file for complete search history.

(56) References Cited

U.S. PATENT DOCUMENTS

| | | | | | |
|---|---|---|---|---|---|
| 3,253,806 | A | * | 5/1966 | Eickman | B64C 27/12 244/17.23 |
| 3,417,729 | A | * | 12/1968 | Gilday | B64C 27/006 416/61 |
| 3,483,696 | A | * | 12/1969 | Albert | B64C 27/08 416/157 R |
| 3,575,527 | A | * | 4/1971 | Watanabe | F04D 29/052 416/169 R |
| 3,805,723 | A | * | 4/1974 | Bernaerts | B63H 3/002 416/61 |
| 4,262,712 | A | * | 4/1981 | Young | B67D 7/54 141/DIG. 1 |
| 4,865,248 | A | * | 9/1989 | Barth | E05B 35/086 312/215 |
| 4,954,962 | A | * | 9/1990 | Evans, Jr. | G05D 1/0246 701/28 |
| 4,974,795 | A | * | 12/1990 | Christol | E01F 3/00 244/114 R |
| 5,040,116 | A | * | 8/1991 | Evans, Jr. | G05D 1/0246 701/28 |

(Continued)

*Primary Examiner* — Medhat Badawi
(74) *Attorney, Agent, or Firm* — Athorus, PLLC

(57) ABSTRACT

Described is an aerial vehicle landing pad configured to capture various metrics regarding landing of an aerial vehicle thereon. The landing pad may be formed of layers, such as one or more sensors layers enclosed in protective layers. The landing pad may include elements with force sensors to sense a force of a landing of an aerial vehicle on the landing pad. The landing pad may include elements with pressure sensors to determine elements subject to pressure from landing structures of the aerial vehicle on the landing pad. Locations of the elements that indicate a pressure signal may be used determine a location of the aerial vehicle on the landing pad, an orientation of the aerial vehicle, and/or a type of aerial vehicle.

19 Claims, 15 Drawing Sheets

(56) References Cited

U.S. PATENT DOCUMENTS

| | | | | |
|---|---|---|---|---|
| 5,116,273 A * | 5/1992 | Chan | A45B 23/00 | 160/370.21 |
| 5,283,739 A * | 2/1994 | Summerville | G05D 1/0289 | 700/255 |
| 5,371,581 A * | 12/1994 | Wangler | G01S 17/933 | 340/963 |
| 5,386,462 A * | 1/1995 | Schlamp | G07F 11/62 | 379/93.12 |
| 5,452,374 A * | 9/1995 | Cullen | G06T 7/70 | 382/296 |
| 5,497,236 A * | 3/1996 | Wolff | H04N 1/047 | 358/406 |
| 5,731,884 A * | 3/1998 | Inoue | H04N 1/4076 | 358/3.06 |
| 5,842,667 A * | 12/1998 | Jones | B64F 1/00 | 244/114 R |
| 5,847,522 A * | 12/1998 | Barba | H02K 7/1025 | 318/269 |
| 5,901,253 A * | 5/1999 | Tretter | G06T 3/606 | 382/292 |
| 5,995,898 A * | 11/1999 | Tuttle | G07C 5/085 | 427/255.31 |
| 6,031,612 A * | 2/2000 | Shirley | G01B 11/2531 | 356/511 |
| 6,073,283 A * | 6/2000 | Zheng | A47G 9/062 | 5/502 |
| 6,079,668 A * | 6/2000 | Brown | B64F 1/36 | 244/114 R |
| 6,266,577 B1 * | 7/2001 | Popp | B25J 9/1682 | 700/248 |
| 6,344,796 B1 * | 2/2002 | Ogilvie | G07C 9/27 | 340/568.1 |
| 6,374,155 B1 * | 4/2002 | Wallach | G05D 1/0295 | 701/25 |
| 6,426,699 B1 * | 7/2002 | Porter | A47F 10/00 | 340/568.1 |
| 6,507,670 B1 * | 1/2003 | Moed | G06T 5/77 | 382/172 |
| 6,543,983 B1 * | 4/2003 | Felder | B23Q 7/1442 | 414/389 |
| 6,636,781 B1 * | 10/2003 | Shen | B25J 9/065 | 703/2 |
| 6,676,460 B1 * | 1/2004 | Motsenbocker | B63H 5/165 | 440/71 |
| 6,690,997 B2 * | 2/2004 | Rivalto | G06Q 10/0835 | 700/242 |
| 6,694,217 B2 * | 2/2004 | Bloom | G07C 9/21 | 700/242 |
| 6,705,523 B1 * | 3/2004 | Stamm | G06Q 10/08 | 235/383 |
| 6,804,607 B1 * | 10/2004 | Wood | G05D 1/1062 | 340/425.5 |
| 6,919,803 B2 * | 7/2005 | Breed | G08B 29/181 | 340/568.1 |
| 6,954,290 B1 * | 10/2005 | Braudaway | H04N 1/00045 | 358/488 |
| 6,961,711 B1 * | 11/2005 | Chee | G07F 7/00 | 705/26.1 |
| 6,965,440 B1 * | 11/2005 | Nakagiri | G06F 3/1262 | 715/251 |
| 6,970,838 B1 * | 11/2005 | Kamath | G06Q 30/0617 | 705/26.81 |
| 7,006,952 B1 * | 2/2006 | Matsumoto | G06F 7/60 | 703/2 |
| 7,016,536 B1 * | 3/2006 | Ling | G06V 30/15 | 382/290 |
| 7,031,519 B2 * | 4/2006 | Elmenhurst | G06F 18/254 | 382/101 |
| 7,082,883 B1 * | 8/2006 | Arias | A47C 31/11 | 108/90 |
| 7,129,817 B2 * | 10/2006 | Yamagishi | G07C 9/37 | 340/5.71 |
| 7,133,743 B2 * | 11/2006 | Tilles | G07F 17/13 | 700/242 |
| 7,145,699 B2 * | 12/2006 | Dolan | G06V 30/1478 | 358/452 |
| 7,149,611 B2 * | 12/2006 | Beck | B64U 30/26 | 701/32.4 |
| 7,171,879 B2 * | 2/2007 | Gass | B27G 21/00 | 83/477.1 |
| 7,188,513 B2 * | 3/2007 | Wilson | G01N 1/2226 | 73/864.81 |
| 7,334,755 B2 * | 2/2008 | Svoboda, Jr. | B64C 27/08 | 244/17.23 |
| 7,335,071 B1 * | 2/2008 | Motsenbocker | B63H 23/30 | 440/71 |
| 7,337,686 B2 * | 3/2008 | Sagi-Dolev | G01V 11/00 | 73/866 |
| 7,337,944 B2 * | 3/2008 | Devar | A47G 29/16 | 232/19 |
| 7,339,993 B1 * | 3/2008 | Brooks | H04N 21/440281 | 375/240.1 |
| 7,459,880 B1 * | 12/2008 | Rosen | H01M 10/465 | 320/101 |
| 7,639,386 B1 * | 12/2009 | Siegel | G06Q 40/03 | 358/1.18 |
| 7,668,404 B2 * | 2/2010 | Adams | G06V 10/24 | 382/101 |
| 7,673,831 B2 * | 3/2010 | Steele | F42B 12/365 | 244/1 TD |
| 7,685,953 B2 * | 3/2010 | Giles | B63J 99/00 | 114/72 |
| 7,693,745 B1 * | 4/2010 | Pomerantz | G07F 17/13 | 705/26.5 |
| 7,780,148 B2 * | 8/2010 | Kirby | E01F 7/02 | 256/12.5 |
| 7,894,939 B2 * | 2/2011 | Zini | G05D 1/028 | 700/245 |
| 7,925,375 B2 * | 4/2011 | Schininger | G07F 11/54 | 700/214 |
| 7,946,526 B2 * | 5/2011 | Zimet | B64U 30/24 | 244/17.23 |
| 7,946,530 B1 * | 5/2011 | Talmage, Jr. | B64C 27/006 | 244/140 |
| 7,966,093 B2 * | 6/2011 | Zhuk | G05D 1/0088 | 706/50 |
| 8,015,023 B1 * | 9/2011 | Lee | G06Q 10/08 | 700/226 |
| 8,052,081 B2 * | 11/2011 | Olm | B64U 10/13 | 244/17.23 |
| 8,078,317 B2 * | 12/2011 | Allinson | G07F 11/62 | 700/242 |
| 8,126,642 B2 * | 2/2012 | Trepagnier | G05D 1/024 | 701/28 |
| 8,131,607 B2 * | 3/2012 | Park | G06Q 10/047 | 705/28 |
| 8,145,351 B2 * | 3/2012 | Schininger | G07F 9/009 | 221/12 |
| 8,195,328 B2 * | 6/2012 | Mallett | G16H 40/67 | 221/102 |
| 8,245,469 B2 * | 8/2012 | Rubel | E04B 5/48 | 52/223.6 |
| 8,256,172 B2 * | 9/2012 | Benson | E04F 15/02183 | 52/489.1 |
| 8,286,236 B2 * | 10/2012 | Jung | G06Q 50/18 | 713/168 |
| 8,412,588 B1 * | 4/2013 | Bodell | G06Q 30/0643 | 706/919 |
| 8,424,802 B2 * | 4/2013 | Tripier-Larivaud | E01F 3/00 | 244/116 |
| 8,429,754 B2 * | 4/2013 | Jung | H04L 9/40 | 726/21 |
| 8,511,606 B1 * | 8/2013 | Lutke | B64U 80/40 | 320/109 |
| 8,599,027 B2 * | 12/2013 | Sanchez | G01S 13/931 | 340/435 |
| 8,602,349 B2 * | 12/2013 | Petrov | G05D 1/0866 | 244/17.23 |

(56) References Cited

U.S. PATENT DOCUMENTS

| | | | | |
|---|---|---|---|---|
| 8,639,400 B1* | 1/2014 | Wong | | A63H 27/12 |
| | | | | 701/16 |
| 8,736,820 B2* | 5/2014 | Choe | | G05D 1/024 |
| | | | | 356/9 |
| 8,752,166 B2* | 6/2014 | Jung | | B33Y 50/02 |
| | | | | 700/95 |
| 8,791,790 B2* | 7/2014 | Robertson | | G07C 9/20 |
| | | | | 455/411 |
| 8,874,301 B1* | 10/2014 | Rao | | B60K 28/04 |
| | | | | 340/576 |
| 8,899,903 B1* | 12/2014 | Saad | | B65G 67/00 |
| | | | | 320/109 |
| 8,948,914 B2* | 2/2015 | Zini | | G05B 19/41895 |
| | | | | 700/258 |
| 8,956,100 B2* | 2/2015 | Davi | | B60P 1/02 |
| | | | | 414/334 |
| 8,989,053 B1* | 3/2015 | Skaaksrud | | H04W 4/80 |
| | | | | 370/255 |
| 9,033,285 B2* | 5/2015 | Iden | | B61C 17/12 |
| | | | | 701/19 |
| 9,050,997 B1* | 6/2015 | Schramm | | B62D 6/002 |
| 9,051,043 B1* | 6/2015 | Peeters | | G05D 1/104 |
| 9,056,676 B1* | 6/2015 | Wang | | B60R 9/00 |
| 9,079,587 B1* | 7/2015 | Rupp | | G05D 1/0289 |
| 9,126,693 B1* | 9/2015 | Shi | | G05D 1/0669 |
| 9,139,310 B1* | 9/2015 | Wang | | G05D 1/102 |
| 9,163,909 B2* | 10/2015 | Chengalva | | G05D 1/0088 |
| 9,193,452 B2* | 11/2015 | Carreker | | B64C 27/52 |
| 9,195,959 B1* | 11/2015 | Lopez | | G06Q 30/0635 |
| 9,216,587 B2* | 12/2015 | Ando | | B41J 29/38 |
| 9,216,857 B1* | 12/2015 | Kalyan | | G06Q 10/087 |
| 9,235,213 B2* | 1/2016 | Villamar | | G06Q 10/087 |
| 9,244,147 B1* | 1/2016 | Soundararajan | | G06Q 10/0833 |
| 9,256,852 B1* | 2/2016 | Myllymaki | | B60P 3/007 |
| 9,261,578 B2* | 2/2016 | Im | | G01S 0/2526 |
| 9,290,277 B2* | 3/2016 | You | | B64C 50/34 |
| 9,321,531 B1* | 4/2016 | Takayama | | B64D 47/06 |
| 9,336,635 B2* | 5/2016 | Robertson | | G07C 9/00571 |
| 9,358,975 B1* | 6/2016 | Watts | | G05D 1/0223 |
| 9,381,916 B1* | 7/2016 | Zhu | | B60W 30/0956 |
| 9,387,928 B1* | 7/2016 | Gentry | | B64U 50/39 |
| 9,397,518 B1* | 7/2016 | Theobald | | B25J 5/005 |
| 9,404,761 B2* | 8/2016 | Meuleau | | G01C 21/3453 |
| 9,409,644 B2* | 8/2016 | Stanek | | G05D 1/0202 |
| 9,411,337 B1* | 8/2016 | Theobald | | G05D 1/0225 |
| 9,412,280 B1* | 8/2016 | Zwillinger | | G08G 5/54 |
| 9,421,869 B1* | 8/2016 | Ananthanarayanan | | |
| | | | | B60L 5/005 |
| 9,436,183 B2* | 9/2016 | Thakur | | G01C 21/3407 |
| 9,436,926 B2* | 9/2016 | Cousins | | G05D 1/0246 |
| 9,446,858 B2* | 9/2016 | Hess | | B64F 3/02 |
| 9,448,559 B2* | 9/2016 | Kojo | | G01C 21/3685 |
| 9,457,899 B2* | 10/2016 | Duffy | | B64U 10/16 |
| 9,489,490 B1* | 11/2016 | Theobald | | G16H 20/13 |
| 9,527,605 B1* | 12/2016 | Gentry | | G05D 1/0094 |
| 9,535,421 B1* | 1/2017 | Canoso | | G05D 1/0214 |
| 9,551,989 B2* | 1/2017 | Scarlatti | | G05D 1/00 |
| 9,561,941 B1* | 2/2017 | Watts | | G05D 1/0268 |
| 9,563,201 B1* | 2/2017 | Tofte | | H04N 23/90 |
| 9,568,335 B2* | 2/2017 | Thakur | | G05D 1/0217 |
| 9,582,950 B2* | 2/2017 | Shimizu | | G07C 9/28 |
| 9,589,448 B1* | 3/2017 | Schneider | | F41H 9/10 |
| 9,600,645 B2* | 3/2017 | Fadell | | H04L 67/12 |
| 9,619,776 B1* | 4/2017 | Ford | | B64U 80/86 |
| 9,623,562 B1* | 4/2017 | Watts | | B25J 13/006 |
| 9,643,722 B1* | 5/2017 | Myslinski | | G05D 1/689 |
| 9,650,136 B1* | 5/2017 | Haskin | | B64U 10/13 |
| 9,652,912 B2* | 5/2017 | Fadell | | G06Q 10/08 |
| 9,656,805 B1* | 5/2017 | Evans | | B64U 80/25 |
| 9,671,791 B1* | 6/2017 | Paczan | | G08G 5/57 |
| 9,676,481 B1* | 6/2017 | Buchmueller | | G05D 1/0094 |
| 9,677,564 B1* | 6/2017 | Woodworth | | B64U 20/30 |
| 9,697,730 B2* | 7/2017 | Thakur | | G08G 1/0112 |
| 9,718,564 B1* | 8/2017 | Beckman | | B61L 15/0027 |
| 9,720,414 B1* | 8/2017 | Theobald | | B25J 5/007 |
| 9,733,646 B1* | 8/2017 | Nusser | | B65G 57/03 |
| 9,746,852 B1* | 8/2017 | Watts | | G01S 17/86 |
| 9,746,853 B2* | 8/2017 | Scheepjens | | G05D 1/0212 |
| 9,777,502 B2* | 10/2017 | Curlander | | B64F 1/025 |
| 9,778,653 B1* | 10/2017 | McClintock | | G06Q 10/08 |
| 9,783,075 B2* | 10/2017 | Henry | | B60L 53/36 |
| 9,783,301 B2* | 10/2017 | Schliwa | | B64D 11/0007 |
| 9,786,187 B1* | 10/2017 | Bar-Zeev | | G06Q 10/08355 |
| 9,796,529 B1* | 10/2017 | Hoareau | | G06Q 10/08 |
| 9,815,633 B1* | 11/2017 | Kisser | | B65G 37/02 |
| 9,828,092 B1* | 11/2017 | Navot | | B64U 10/14 |
| 9,858,604 B2* | 1/2018 | Apsley | | G06Q 30/0635 |
| 9,886,035 B1* | 2/2018 | Watts | | G05D 1/0088 |
| 9,896,204 B1* | 2/2018 | Willison | | G05D 1/102 |
| 9,957,045 B1* | 5/2018 | Daly | | B64U 50/19 |
| 9,959,771 B1* | 5/2018 | Carlson | | G08G 5/57 |
| 9,974,612 B2* | 5/2018 | Pinter | | A61B 5/741 |
| 10,022,753 B2* | 7/2018 | Chelian | | B07C 5/362 |
| 10,048,697 B1* | 8/2018 | Theobald | | B65G 47/61 |
| 10,099,561 B1* | 10/2018 | Ananthanarayanan | | |
| | | | | B60L 53/126 |
| 10,099,785 B1* | 10/2018 | Gonzalez | | B64U 50/31 |
| 10,108,185 B1* | 10/2018 | Theobald | | G05B 19/4189 |
| 10,137,984 B1* | 11/2018 | Flick | | B64F 1/00 |
| 10,176,722 B1* | 1/2019 | Boyd | | G08G 5/57 |
| 10,239,638 B1* | 3/2019 | Cohen | | B64U 70/50 |
| 10,268,208 B1* | 4/2019 | Hopwood Thomas | | |
| | | | | G05D 1/0676 |
| 10,287,033 B2* | 5/2019 | Hu | | B64F 1/02 |
| 10,310,501 B2* | 6/2019 | Greenberger | | H02J 7/342 |
| 10,434,885 B2* | 10/2019 | Antonini | | B64C 25/52 |
| 10,467,685 B1* | 11/2019 | Brisson | | G06Q 10/083 |
| 10,526,094 B2* | 1/2020 | Cheng | | B64U 80/25 |
| 10,558,226 B1* | 2/2020 | Bigdeli | | G06V 10/22 |
| 10,577,126 B2* | 3/2020 | Mozer | | B64F 1/02 |
| 10,719,080 B2* | 7/2020 | Zhang | | B64F 5/60 |
| 10,745,102 B2* | 8/2020 | Nysæter | | B64U 30/20 |
| 10,745,132 B1* | 8/2020 | Kimchi | | B64U 10/13 |
| 10,780,988 B2* | 9/2020 | Buchmueller | | B64U 50/19 |
| D903,576 S * | 12/2020 | Feldman | | D12/345 |
| 10,860,115 B1* | 12/2020 | Tran | | G06F 3/0346 |
| 10,870,498 B2* | 12/2020 | Zambelli | | E01F 3/00 |
| 10,875,648 B2* | 12/2020 | Schmalzried | | B64C 39/024 |
| 10,899,436 B2* | 1/2021 | Gentry | | B64C 25/001 |
| 10,967,970 B2* | 4/2021 | Van Niekerk | | B64U 20/87 |
| 10,988,949 B2* | 4/2021 | Puchner | | E04G 21/3233 |
| 11,007,290 B2* | 5/2021 | Kreitenberg | | A61L 2/24 |
| 11,079,752 B1* | 8/2021 | Lombardini | | B64U 80/60 |
| 11,111,033 B1* | 9/2021 | Burks | | B64U 50/19 |
| D932,369 S * | 10/2021 | Passley | | D12/16.1 |
| 11,148,808 B2* | 10/2021 | Wiggerich | | B64U 30/26 |
| 11,156,010 B1* | 10/2021 | Corban | | G06Q 10/083 |
| 11,164,149 B1* | 11/2021 | Williams | | G06K 19/06028 |
| 11,180,253 B1* | 11/2021 | Seeley | | B64U 60/50 |
| 11,235,890 B1* | 2/2022 | Dahlstrom | | B05B 13/005 |
| 11,292,620 B1* | 4/2022 | Molony | | B64G 1/1071 |
| 11,370,561 B2* | 6/2022 | Ratajczak | | B64C 1/061 |
| 11,459,117 B1* | 10/2022 | Shapiro | | G08G 5/54 |
| 11,511,886 B1* | 11/2022 | Tian | | B60P 3/11 |
| 11,524,596 B2* | 12/2022 | Cheng | | B64U 80/70 |
| 11,534,801 B2* | 12/2022 | Volta | | B66F 9/063 |
| 11,572,197 B2* | 2/2023 | Nevdahs | | B64U 50/19 |
| 11,597,515 B2* | 3/2023 | Passley | | B64F 1/007 |
| 11,597,516 B1* | 3/2023 | Klinkmueller | | B64U 70/20 |
| 11,603,218 B2* | 3/2023 | Fisher | | B64F 1/222 |
| 11,603,219 B2* | 3/2023 | Ratajczak | | B64U 30/20 |
| 11,619,952 B2* | 4/2023 | Kwon | | G05D 1/0808 |
| | | | | 701/3 |
| 11,628,932 B2* | 4/2023 | Seung | | B64U 60/50 |
| | | | | 244/17.23 |
| 11,636,771 B2* | 4/2023 | Barker | | B64F 1/222 |
| | | | | 701/16 |
| 11,641,966 B2* | 5/2023 | Nakanishi | | A47G 29/124 |
| | | | | 232/44 |
| 11,649,050 B1* | 5/2023 | Miller | | G05D 1/0808 |
| | | | | 701/11 |

(56) References Cited

U.S. PATENT DOCUMENTS

| | | | | |
|---|---|---|---|---|
| 11,655,048 B2* | 5/2023 | Sugimoto | B64F 1/22 | 244/114 R |
| 11,667,402 B2* | 6/2023 | Liske | B64U 80/25 | 244/116 |
| 11,673,690 B2* | 6/2023 | Dayan | B64U 70/97 | 244/114 R |
| 11,710,092 B2* | 7/2023 | Dearing | G07C 9/00896 | 705/330 |
| 11,713,136 B2* | 8/2023 | Foggia | B64F 1/222 | 244/114 R |
| 11,714,189 B2* | 8/2023 | Padmanabhan | G01S 19/51 | 342/22 |
| 11,738,867 B2* | 8/2023 | Ehasoo | B60L 53/00 | 244/17.11 |
| 11,741,422 B2* | 8/2023 | Gil | G06Q 10/08355 | 705/338 |
| 11,748,688 B2* | 9/2023 | Ur | B64C 39/024 | 705/332 |
| 11,760,485 B2* | 9/2023 | Wabnegger | H02G 1/02 | 244/121 |
| 11,767,129 B2* | 9/2023 | Warwick | B64C 39/024 | 244/137.1 |
| 11,772,814 B2* | 10/2023 | Dubois | B64U 70/83 | 244/110 E |
| 11,776,136 B1* | 10/2023 | Pachikov | B64U 10/13 | 244/17.23 |
| 11,780,606 B2* | 10/2023 | Carthew | B64U 70/99 | 244/114 R |
| 11,794,894 B2* | 10/2023 | Brock | B64U 30/20 | |
| 11,794,922 B1* | 10/2023 | Twyford | B64U 80/25 | |
| 11,808,580 B1* | 11/2023 | Ebrahimi Afrouzi | G05D 1/0272 | |
| 11,814,191 B2* | 11/2023 | Cheng | B64F 1/005 | |
| 11,814,241 B2* | 11/2023 | Tian | B60P 3/11 | |
| D1,008,873 S* | 12/2023 | Lin | D12/16.1 | |
| 11,840,152 B2* | 12/2023 | Fisher | B64C 29/02 | |
| 11,851,162 B1* | 12/2023 | Daube | B64C 19/00 | |
| 11,851,209 B2* | 12/2023 | Fisher | B64F 1/005 | |
| 11,858,662 B2* | 1/2024 | Gil | B64U 80/10 | |
| 11,866,168 B2* | 1/2024 | Cooper | B64U 70/97 | |
| 11,868,146 B2* | 1/2024 | Yasunaga | G05D 1/0094 | |
| 11,884,422 B2* | 1/2024 | Lowe | B64U 50/19 | |
| 11,898,368 B2* | 2/2024 | Blake | B64U 80/10 | |
| 11,900,823 B2* | 2/2024 | Surace | G05D 1/042 | |
| 11,932,315 B2* | 3/2024 | Hwang | B64F 1/32 | |
| 11,933,613 B2* | 3/2024 | Michini | G05D 1/689 | |
| 11,939,046 B1* | 3/2024 | Berry | B64C 27/08 | |
| 11,939,057 B2* | 3/2024 | Hamm | B64U 20/70 | |
| 11,939,080 B2* | 3/2024 | Cowden | B64U 80/30 | |
| 11,939,083 B2* | 3/2024 | Baklycki | B64F 1/36 | |
| 12,032,388 B2* | 7/2024 | Villiers | G08G 5/74 | |
| 12,043,421 B2* | 7/2024 | Cevacins | B64U 70/99 | |
| 12,059,089 B1* | 8/2024 | Dunn | A47G 29/141 | |
| 12,078,912 B2* | 9/2024 | Valio | G03B 15/03 | |
| 12,084,211 B2* | 9/2024 | Li | B64U 70/99 | |
| 12,091,194 B2* | 9/2024 | Wang | B64U 50/37 | |
| 12,099,370 B2* | 9/2024 | Jourdan | G05D 1/0676 | |
| 12,122,243 B2* | 10/2024 | Shah | B64U 80/25 | |
| 12,134,329 B2* | 11/2024 | Todeschini | G05D 1/0202 | |
| 12,168,533 B1* | 12/2024 | Hinman | B64U 70/97 | |
| 12,172,777 B2* | 12/2024 | Carthew | B64U 70/93 | |
| 12,195,213 B2* | 1/2025 | Qi | B64U 70/97 | |
| 2001/0045449 A1* | 11/2001 | Shannon | G07C 9/21 | 232/19 |
| 2002/0016726 A1* | 2/2002 | Ross | G06Q 10/08 | 705/339 |
| 2002/0035450 A1* | 3/2002 | Thackston | G05B 19/4099 | 703/1 |
| 2002/0072979 A1* | 6/2002 | Sinha | G06Q 10/087 | 705/26.7 |
| 2002/0087375 A1* | 7/2002 | Griffin | G06Q 10/0835 | 705/336 |
| 2002/0107751 A1* | 8/2002 | Rajagopalan | G06Q 30/0627 | 705/26.7 |
| 2002/0111914 A1* | 8/2002 | Terada | G06Q 30/02 | 705/60 |
| 2002/0116289 A1* | 8/2002 | Yang | G06Q 10/08 | 705/26.81 |
| 2002/0123930 A1* | 9/2002 | Boyd | G06Q 30/0254 | 705/14.1 |
| 2002/0156645 A1* | 10/2002 | Hansen | G07F 17/13 | 705/26.1 |
| 2003/0040980 A1* | 2/2003 | Nakajima | G07F 17/13 | 705/26.8 |
| 2003/0072031 A1* | 4/2003 | Kuwata | H04N 1/00188 | 358/1.15 |
| 2003/0121968 A1* | 7/2003 | Miller | G07F 17/13 | 235/375 |
| 2003/0141411 A1* | 7/2003 | Pandya | G06Q 10/02 | 244/114 R |
| 2004/0002898 A1* | 1/2004 | Kuhlmann | G06Q 30/0635 | 705/26.81 |
| 2004/0068416 A1* | 4/2004 | Solomon | G05D 1/0088 | 446/454 |
| 2004/0112660 A1* | 6/2004 | Johansson | B63B 27/19 | 180/167 |
| 2004/0160335 A1* | 8/2004 | Reitmeier | A47J 31/4407 | 340/4.12 |
| 2004/0162638 A1* | 8/2004 | Solomon | G05D 1/0088 | 700/247 |
| 2004/0256519 A1* | 12/2004 | Ellis | B64F 1/125 | 244/110 E |
| 2004/0257199 A1* | 12/2004 | Fitzgibbon | G07C 9/00182 | 340/5.71 |
| 2005/0061910 A1* | 3/2005 | Wobben | B64C 29/00 | 244/17.23 |
| 2005/0068178 A1* | 3/2005 | Lee | G06Q 30/06 | 700/214 |
| 2005/0093865 A1* | 5/2005 | Jia | H04N 1/38 | 345/426 |
| 2005/0102240 A1* | 5/2005 | Misra | G06Q 30/06 | 705/59 |
| 2005/0178894 A1* | 8/2005 | McGeer | B64U 70/70 | 244/63 |
| 2005/0244060 A1* | 11/2005 | Nagarajan | H04N 1/41 | 382/302 |
| 2005/0285934 A1* | 12/2005 | Carter | H04N 7/147 | 348/14.06 |
| 2006/0038067 A1* | 2/2006 | Dennis | B64F 1/06 | 244/63 |
| 2006/0053534 A1* | 3/2006 | Mullen | F41H 7/005 | 2/456 |
| 2006/0118162 A1* | 6/2006 | Saelzer | H02J 3/38 | 136/246 |
| 2006/0136237 A1* | 6/2006 | Spiegel | G06Q 10/0835 | 705/13 |
| 2006/0249622 A1* | 11/2006 | Steele | B64U 80/20 | 244/115 |
| 2006/0287829 A1* | 12/2006 | Pashko-Paschenko | G08G 5/723 | 340/436 |
| 2007/0016496 A1* | 1/2007 | Bar | G06Q 10/087 | 705/28 |
| 2007/0073552 A1* | 3/2007 | Hileman | G06Q 10/08 | 705/333 |
| 2007/0102565 A1* | 5/2007 | Speer | B64U 10/20 | 244/2 |
| 2007/0150375 A1* | 6/2007 | Yang | G06Q 10/08 | 705/26.81 |
| 2007/0170237 A1* | 7/2007 | Neff | A47G 29/122 | 232/36 |
| 2007/0176432 A1* | 8/2007 | Rolt | F03D 9/255 | 290/55 |
| 2007/0210953 A1* | 9/2007 | Abraham | G08G 5/57 | 342/36 |
| 2007/0233337 A1* | 10/2007 | Plishner | G05D 1/0295 | 701/23 |

(56) References Cited

U.S. PATENT DOCUMENTS

| | | | |
|---|---|---|---|
| 2007/0244763 A1* | 10/2007 | Williams | G06Q 10/10 705/26.1 |
| 2007/0246601 A1* | 10/2007 | Layton | B64C 39/10 244/12.2 |
| 2007/0262195 A1* | 11/2007 | Bulaga | B64U 10/20 244/12.4 |
| 2007/0293978 A1* | 12/2007 | Wurman | G05B 19/4189 700/213 |
| 2008/0012697 A1* | 1/2008 | Smith | B60K 35/50 340/439 |
| 2008/0027591 A1* | 1/2008 | Lenser | G05D 1/0038 701/28 |
| 2008/0100258 A1* | 5/2008 | Ward | H01M 10/465 320/101 |
| 2008/0109246 A1* | 5/2008 | Russell | G06Q 10/04 414/800 |
| 2008/0111816 A1* | 5/2008 | Abraham | G06Q 30/06 345/420 |
| 2008/0141921 A1* | 6/2008 | Hinderks | F01L 3/22 114/274 |
| 2008/0150679 A1* | 6/2008 | Bloomfield | B60R 25/24 340/5.72 |
| 2008/0154659 A1* | 6/2008 | Bettes | G06Q 10/08 705/7.36 |
| 2008/0167817 A1* | 7/2008 | Hessler | G01C 21/005 701/514 |
| 2008/0184906 A1* | 8/2008 | Kejha | B64D 27/33 102/374 |
| 2008/0189012 A1* | 8/2008 | Kaufmann | B62D 15/025 701/41 |
| 2008/0217486 A1* | 9/2008 | Colten | B64U 10/25 244/45 R |
| 2008/0301009 A1* | 12/2008 | Plaster | G06Q 10/087 705/28 |
| 2009/0027253 A1* | 1/2009 | van Tooren | G08G 5/59 342/29 |
| 2009/0057486 A1* | 3/2009 | Becht, IV | B64F 1/007 244/114 R |
| 2009/0062974 A1* | 3/2009 | Tamamoto | G05D 1/0295 701/25 |
| 2009/0063166 A1* | 3/2009 | Palmer | B65D 19/42 211/133.4 |
| 2009/0079388 A1* | 3/2009 | Reddy | G06Q 40/12 320/109 |
| 2009/0086275 A1* | 4/2009 | Liang | G06V 10/25 358/3.21 |
| 2009/0091435 A1* | 4/2009 | Bolourchi | B60K 28/066 340/575 |
| 2009/0106124 A1* | 4/2009 | Yang | G06Q 30/0601 705/26.1 |
| 2009/0149985 A1* | 6/2009 | Chirnomas | G07F 11/26 705/26.1 |
| 2009/0164379 A1* | 6/2009 | Jung | G06Q 10/06 705/310 |
| 2009/0165127 A1* | 6/2009 | Jung | G06Q 10/06 726/21 |
| 2009/0216394 A1* | 8/2009 | Heppe | B64U 20/87 701/16 |
| 2009/0236470 A1* | 9/2009 | Goossen | B64U 70/80 244/115 |
| 2009/0254457 A1* | 10/2009 | Folsom | G06Q 30/0601 705/26.1 |
| 2009/0254482 A1* | 10/2009 | Vadlamani | G06F 21/10 705/59 |
| 2009/0299903 A1* | 12/2009 | Hung | G06Q 20/40 235/462.11 |
| 2009/0303507 A1* | 12/2009 | Abeloe | B33Y 30/00 358/1.9 |
| 2009/0314883 A1* | 12/2009 | Arlton | B64U 80/40 244/63 |
| 2010/0007479 A1* | 1/2010 | Smith | B60W 50/14 340/576 |
| 2010/0030608 A1* | 2/2010 | Kaminsky | G06Q 10/10 707/E17.014 |
| 2010/0031351 A1* | 2/2010 | Jung | G06F 21/10 700/98 |
| 2010/0038480 A1* | 2/2010 | Wu | B64F 1/26 244/114 B |
| 2010/0088163 A1* | 4/2010 | Davidson | G06Q 10/08 340/425.5 |
| 2010/0088175 A1* | 4/2010 | Lundquist | G06Q 30/0234 705/26.1 |
| 2010/0100269 A1* | 4/2010 | Ekhaguere | G08G 5/74 701/26 |
| 2010/0169185 A1* | 7/2010 | Cottingham | G06F 3/01 715/708 |
| 2010/0170993 A1* | 7/2010 | Misegades | B64C 7/00 244/130 |
| 2010/0206145 A1* | 8/2010 | Tetelbaum | B27G 19/02 83/13 |
| 2010/0287065 A1* | 11/2010 | Alivandi | G06Q 30/02 705/26.1 |
| 2010/0299067 A1* | 11/2010 | McCollough | G08G 5/51 701/301 |
| 2010/0299222 A1* | 11/2010 | Hamilton, IV | G06Q 20/12 705/26.1 |
| 2010/0320313 A1* | 12/2010 | Hanafin | B64F 1/125 244/114 R |
| 2011/0035149 A1* | 2/2011 | McAndrew | G05D 1/0077 701/466 |
| 2011/0068224 A1* | 3/2011 | Kang | B64U 80/25 244/116 |
| 2011/0074570 A1* | 3/2011 | Feldstein | G08B 13/196 348/E7.087 |
| 2011/0087350 A1* | 4/2011 | Fogel | G06T 19/00 700/98 |
| 2011/0112761 A1* | 5/2011 | Hurley | G06Q 10/08 701/465 |
| 2011/0153052 A1* | 6/2011 | Pettibone | G06F 30/13 700/98 |
| 2011/0166707 A1* | 7/2011 | Romanov | G01S 5/16 700/255 |
| 2011/0174925 A1* | 7/2011 | Ying | B64F 1/005 701/16 |
| 2011/0178711 A1* | 7/2011 | Christoph | G01S 7/51 701/301 |
| 2011/0210866 A1* | 9/2011 | David | G08G 1/166 340/901 |
| 2011/0227435 A1* | 9/2011 | Maeda | B60L 50/16 310/77 |
| 2011/0246331 A1* | 10/2011 | Luther | G06Q 30/0627 705/26.63 |
| 2011/0253831 A1* | 10/2011 | Cheng | A63H 27/12 244/17.11 |
| 2011/0264311 A1* | 10/2011 | Lee | H04N 7/183 348/E7.085 |
| 2011/0282476 A1* | 11/2011 | Hegemier | G06Q 30/0621 705/26.5 |
| 2011/0301787 A1* | 12/2011 | Chaperon | A63H 27/12 701/2 |
| 2011/0313878 A1* | 12/2011 | Norman | G06F 30/12 705/26.5 |
| 2012/0039694 A1* | 2/2012 | Suzanne | E04H 5/02 414/339 |
| 2012/0078592 A1* | 3/2012 | Sims, Jr. | G06F 30/00 703/1 |
| 2012/0080556 A1* | 4/2012 | Root, Jr. | B64F 1/06 73/170.28 |
| 2012/0091260 A1* | 4/2012 | Callou | G05D 1/0858 244/17.13 |
| 2012/0109419 A1* | 5/2012 | Mercado | G07C 9/00182 701/2 |
| 2012/0219397 A1* | 8/2012 | Baker | B65G 1/1373 414/796 |
| 2012/0221438 A1* | 8/2012 | Cook, Jr. | G06Q 30/0641 705/26.61 |
| 2012/0227389 A1* | 9/2012 | Hinderks | F02B 75/002 60/317 |

(56) References Cited

U.S. PATENT DOCUMENTS

| | | | |
|---|---|---|---|
| 2012/0229325 A1* | 9/2012 | Dutruc | G01S 7/03 342/29 |
| 2012/0234969 A1* | 9/2012 | Savoye | B64U 10/13 244/17.11 |
| 2012/0235606 A1* | 9/2012 | Takeuchi | H02K 7/116 318/371 |
| 2012/0323365 A1* | 12/2012 | Taylor | G05D 1/0225 901/1 |
| 2013/0006739 A1* | 1/2013 | Horvitz | G06Q 30/0222 705/14.23 |
| 2013/0073477 A1* | 3/2013 | Grinberg | G06Q 30/00 705/332 |
| 2013/0081245 A1* | 4/2013 | Vavrina | B60L 53/51 29/281.1 |
| 2013/0093582 A1* | 4/2013 | Walsh | G08G 1/166 340/436 |
| 2013/0099054 A1* | 4/2013 | Besenzoni | B64F 1/007 244/110 E |
| 2013/0126611 A1* | 5/2013 | Kangas | G06K 7/10178 235/385 |
| 2013/0148123 A1* | 6/2013 | Hayashi | G03F 9/7046 356/401 |
| 2013/0193269 A1* | 8/2013 | Zwaan | B64U 20/87 244/118.1 |
| 2013/0206915 A1* | 8/2013 | Desaulniers | B64U 10/20 244/165 |
| 2013/0218446 A1* | 8/2013 | Bradley | G06Q 10/00 701/123 |
| 2013/0218799 A1* | 8/2013 | Lehmann | G06Q 10/063 705/337 |
| 2013/0233964 A1* | 9/2013 | Woodworth | B64U 10/60 244/175 |
| 2013/0261792 A1* | 10/2013 | Gupta | G05B 15/02 700/232 |
| 2013/0262252 A1* | 10/2013 | Lakshman | G06Q 30/06 705/26.1 |
| 2013/0262276 A1* | 10/2013 | Wan | G06Q 10/00 705/28 |
| 2013/0262336 A1* | 10/2013 | Wan | G06Q 10/087 705/339 |
| 2013/0264381 A1* | 10/2013 | Kim | G07F 17/13 232/24 |
| 2013/0320133 A1* | 12/2013 | Ratti | B64C 33/025 244/22 |
| 2013/0324164 A1* | 12/2013 | Vulcano | H04W 4/02 455/457 |
| 2013/0332062 A1* | 12/2013 | Kreitmair-Steck | G08G 5/80 701/301 |
| 2013/0344778 A1* | 12/2013 | Schafer | B24B 41/02 451/294 |
| 2014/0010656 A1* | 1/2014 | Nies | F03D 7/0244 29/889 |
| 2014/0025230 A1* | 1/2014 | Levien | A63H 27/12 701/2 |
| 2014/0030444 A1* | 1/2014 | Swaminathan | C23C 16/48 427/569 |
| 2014/0031964 A1* | 1/2014 | Sidhu | G05B 19/41865 700/99 |
| 2014/0032034 A1* | 1/2014 | Raptopoulos | G08G 5/55 701/25 |
| 2014/0040065 A1* | 2/2014 | DuBois | G06Q 30/0621 705/26.5 |
| 2014/0052661 A1* | 2/2014 | Shakes | G06Q 10/0836 705/339 |
| 2014/0058959 A1* | 2/2014 | Isbjornssund | G06Q 50/184 705/310 |
| 2014/0081445 A1* | 3/2014 | Villamar | G06Q 10/087 701/19 |
| 2014/0089073 A1* | 3/2014 | Jacobs | G06Q 20/326 705/16 |
| 2014/0124619 A1* | 5/2014 | McGeer | B64U 70/70 244/110 F |
| 2014/0124621 A1* | 5/2014 | Godzdanker | B64F 1/125 244/110 E |
| 2014/0136282 A1* | 5/2014 | Fedele | G06Q 10/06 705/7.31 |
| 2014/0136414 A1* | 5/2014 | Abhyanker | G06Q 20/3224 701/25 |
| 2014/0149244 A1* | 5/2014 | Abhyanker | G06Q 30/0605 705/26.2 |
| 2014/0156053 A1* | 6/2014 | Mahdavi | B29C 64/112 700/119 |
| 2014/0180914 A1* | 6/2014 | Abhyanker | G06Q 10/0832 705/332 |
| 2014/0200697 A1* | 7/2014 | Cheng | G06Q 30/06 700/98 |
| 2014/0214684 A1* | 7/2014 | Pell | G06Q 30/02 705/57 |
| 2014/0244433 A1* | 8/2014 | Cruz | G06T 7/001 705/26.8 |
| 2014/0254896 A1* | 9/2014 | Zhou | G06Q 20/3829 705/16 |
| 2014/0257595 A1* | 9/2014 | Tillmann | B64U 10/14 701/2 |
| 2014/0271200 A1* | 9/2014 | Sutton | B64C 27/33 29/889 |
| 2014/0283104 A1* | 9/2014 | Nilsson | H04N 1/32117 726/26 |
| 2014/0309813 A1* | 10/2014 | Ricci | G06V 20/59 701/1 |
| 2014/0319272 A1* | 10/2014 | Casado | B60L 58/10 244/110 E |
| 2014/0325218 A1* | 10/2014 | Shimizu | H04L 12/10 713/168 |
| 2014/0330456 A1* | 11/2014 | Lopez Morales | G06Q 10/087 701/3 |
| 2015/0006005 A1* | 1/2015 | Yu | G05D 1/667 701/22 |
| 2015/0066178 A1* | 3/2015 | Stava | B22F 10/47 700/98 |
| 2015/0069968 A1* | 3/2015 | Pounds | B60L 53/35 320/109 |
| 2015/0097530 A1* | 4/2015 | Scarlatti | H02J 7/00 320/109 |
| 2015/0098819 A1* | 4/2015 | Tourin | G01M 5/0091 416/61 |
| 2015/0102154 A1* | 4/2015 | Duncan | G05D 1/0094 701/300 |
| 2015/0112837 A1* | 4/2015 | O'Dea | G06Q 20/26 705/26.41 |
| 2015/0112885 A1* | 4/2015 | Fadell | G08B 29/185 705/330 |
| 2015/0120094 A1* | 4/2015 | Kimchi | B64U 10/14 701/3 |
| 2015/0120602 A1* | 4/2015 | Huffman | G06Q 10/083 700/214 |
| 2015/0123462 A1* | 5/2015 | Kamradt | B67D 7/02 141/192 |
| 2015/0127712 A1* | 5/2015 | Fadell | H04L 12/2807 709/202 |
| 2015/0129716 A1* | 5/2015 | Yoffe | B64F 1/029 244/110 C |
| 2015/0158587 A1* | 6/2015 | Patrick | B64D 1/22 701/3 |
| 2015/0158599 A1* | 6/2015 | Sisko | B64F 1/20 244/114 R |
| 2015/0167262 A1* | 6/2015 | Gartner | E01F 7/02 256/12.5 |
| 2015/0175276 A1* | 6/2015 | Koster | A47G 29/14 244/114 R |
| 2015/0183528 A1* | 7/2015 | Walsh | B64C 39/024 244/114 R |
| 2015/0185034 A1* | 7/2015 | Abhyanker | G05D 1/0088 701/23 |
| 2015/0191255 A1* | 7/2015 | Zolich | B64F 1/16 340/946 |
| 2015/0202770 A1* | 7/2015 | Patron | G06Q 50/01 901/50 |

(56) References Cited

U.S. PATENT DOCUMENTS

| | | | |
|---|---|---|---|
| 2015/0217860 A1* | 8/2015 | Yang | B64C 25/32 244/102 R |
| 2015/0227882 A1* | 8/2015 | Bhatt | G06Q 10/083 705/330 |
| 2015/0246727 A1* | 9/2015 | Masticola | G08B 29/145 701/2 |
| 2015/0253777 A1* | 9/2015 | Binney | G05D 1/0214 701/28 |
| 2015/0254611 A1* | 9/2015 | Perez | G06Q 10/08355 705/5 |
| 2015/0259078 A1* | 9/2015 | Filipovic | H04W 4/38 244/114 R |
| 2015/0286216 A1* | 10/2015 | Miwa | G05D 1/0808 701/4 |
| 2015/0314881 A1* | 11/2015 | Tsaliah | B64D 17/725 244/146 |
| 2015/0317597 A1* | 11/2015 | Shucker | G06Q 10/0833 235/375 |
| 2015/0332206 A1* | 11/2015 | Trew | G06Q 10/083 705/330 |
| 2015/0336669 A1* | 11/2015 | Kantor | G01C 21/343 701/3 |
| 2015/0336670 A1* | 11/2015 | Zhang | B29C 43/18 244/119 |
| 2015/0336677 A1* | 11/2015 | Smaoui | H01R 24/38 320/109 |
| 2015/0363843 A1* | 12/2015 | Loppatto | G06Q 30/0283 705/330 |
| 2015/0367850 A1* | 12/2015 | Clarke | H04N 23/90 701/28 |
| 2015/0370251 A1* | 12/2015 | Siegel | B64D 1/22 701/2 |
| 2016/0001877 A1* | 1/2016 | Paulos | B64U 30/29 701/3 |
| 2016/0001883 A1* | 1/2016 | Sanz | B64U 10/13 244/17.23 |
| 2016/0003637 A1* | 1/2016 | Andersen | G01C 21/362 701/519 |
| 2016/0009413 A1* | 1/2016 | Lee | G08G 5/57 701/16 |
| 2016/0011592 A1* | 1/2016 | Zhang | B64U 70/97 244/114 R |
| 2016/0019495 A1* | 1/2016 | Kolchin | G06Q 10/0833 705/333 |
| 2016/0023761 A1* | 1/2016 | McNally | G05D 1/0094 701/3 |
| 2016/0033966 A1* | 2/2016 | Farris | G01C 21/20 701/16 |
| 2016/0039541 A1* | 2/2016 | Beardsley | G05D 1/0011 701/2 |
| 2016/0051110 A1* | 2/2016 | Cao | A47L 9/009 15/324 |
| 2016/0058181 A1* | 3/2016 | Han | H04N 23/661 312/236 |
| 2016/0068264 A1* | 3/2016 | Ganesh | G08G 5/55 701/4 |
| 2016/0068265 A1* | 3/2016 | Hoareau | G06Q 10/08 701/3 |
| 2016/0068267 A1* | 3/2016 | Liu | G05D 1/042 701/4 |
| 2016/0070265 A1* | 3/2016 | Liu | B64C 39/024 701/25 |
| 2016/0085238 A1* | 3/2016 | Hayes | G08G 5/22 701/4 |
| 2016/0101856 A1* | 4/2016 | Kohstall | G05D 1/0669 244/17.23 |
| 2016/0104099 A1* | 4/2016 | Villamar | G06Q 10/08 705/26.81 |
| 2016/0104113 A1* | 4/2016 | Gorlin | G06Q 10/08355 705/338 |
| 2016/0107750 A1* | 4/2016 | Yates | B64U 10/25 244/2 |
| 2016/0114488 A1* | 4/2016 | Mascorro Medina | B25J 9/1697 901/1 |
| 2016/0117931 A1* | 4/2016 | Chan | G08G 5/56 701/120 |
| 2016/0125746 A1* | 5/2016 | Kunzi | G08G 5/55 701/11 |
| 2016/0129592 A1* | 5/2016 | Saboo | B25J 5/007 700/248 |
| 2016/0130000 A1* | 5/2016 | Rimanelli | B64U 20/50 244/2 |
| 2016/0130015 A1* | 5/2016 | Caubel | B64C 27/001 244/120 |
| 2016/0131025 A1* | 5/2016 | Pekrul | F02B 53/10 123/205 |
| 2016/0131358 A1* | 5/2016 | Spiro | H05B 47/105 455/561 |
| 2016/0132059 A1* | 5/2016 | Mason | B65G 1/1373 701/28 |
| 2016/0144734 A1* | 5/2016 | Wang | B64C 29/0016 701/17 |
| 2016/0144982 A1* | 5/2016 | Sugumaran | B64C 25/32 244/108 |
| 2016/0180618 A1* | 6/2016 | Ho | G07C 9/00563 340/5.52 |
| 2016/0185466 A1* | 6/2016 | Dreano, Jr. | G06Q 10/083 705/26.81 |
| 2016/0194959 A1* | 7/2016 | Pekrul | F01C 19/06 418/146 |
| 2016/0196755 A1* | 7/2016 | Navot | G05D 1/0088 701/4 |
| 2016/0196756 A1* | 7/2016 | Prakash | B64U 80/25 701/3 |
| 2016/0200438 A1* | 7/2016 | Bokeno | B64C 39/024 244/2 |
| 2016/0207627 A1* | 7/2016 | Hoareau | B64D 1/02 |
| 2016/0214717 A1* | 7/2016 | De Silva | B64D 5/00 |
| 2016/0214728 A1* | 7/2016 | Rossi | B64U 30/291 |
| 2016/0221671 A1* | 8/2016 | Fisher | B64U 30/26 |
| 2016/0229299 A1* | 8/2016 | Streett | B64F 1/222 |
| 2016/0229530 A1* | 8/2016 | Welsh | B64U 30/24 |
| 2016/0235236 A1* | 8/2016 | Byers | A47G 29/14 |
| 2016/0239789 A1* | 8/2016 | Hanks | G06Q 30/04 |
| 2016/0239803 A1* | 8/2016 | Borley | G06Q 10/08355 |
| 2016/0244162 A1* | 8/2016 | Weller | B64U 10/13 |
| 2016/0244187 A1* | 8/2016 | Byers | A47G 29/14 |
| 2016/0257401 A1* | 9/2016 | Buchmueller | G01C 21/343 |
| 2016/0257423 A1* | 9/2016 | Martin | A47G 29/14 |
| 2016/0257424 A1* | 9/2016 | Stabler | A63H 27/12 |
| 2016/0257426 A1* | 9/2016 | Mozer | B64U 70/30 |
| 2016/0258775 A1* | 9/2016 | Santilli | G06Q 10/0833 |
| 2016/0266578 A1* | 9/2016 | Douglas | G05D 1/0282 |
| 2016/0272317 A1* | 9/2016 | Cho | G08G 1/162 |
| 2016/0280371 A1* | 9/2016 | Canavor | H04W 4/029 |
| 2016/0282126 A1* | 9/2016 | Watts | G06Q 10/08 |
| 2016/0286128 A1* | 9/2016 | Zhou | H04N 23/698 |
| 2016/0291445 A1* | 10/2016 | Fisher, Sr. | F16M 11/10 |
| 2016/0299233 A1* | 10/2016 | Levien | G08G 5/53 |
| 2016/0304198 A1* | 10/2016 | Jourdan | G08G 5/57 |
| 2016/0304217 A1* | 10/2016 | Fisher | B64F 1/222 |
| 2016/0307448 A1* | 10/2016 | Salnikov | A01C 21/00 |
| 2016/0311329 A1* | 10/2016 | Rodriguez | B60L 58/18 |
| 2016/0321503 A1* | 11/2016 | Zhou | B64U 50/38 |
| 2016/0334229 A1* | 11/2016 | Ross | G08B 25/00 |
| 2016/0340006 A1* | 11/2016 | Tang | B63C 9/01 |
| 2016/0340021 A1* | 11/2016 | Zhang | B64C 27/006 |
| 2016/0355261 A1* | 12/2016 | Chin | B64U 70/20 |
| 2016/0364660 A1* | 12/2016 | Brown | G01C 21/20 |
| 2016/0364679 A1* | 12/2016 | Cao | G06Q 10/083 |
| 2016/0364823 A1* | 12/2016 | Cao | G06Q 50/40 |
| 2016/0364989 A1* | 12/2016 | Speasl | G08G 5/57 |
| 2016/0371984 A1* | 12/2016 | Macfarlane | G05D 1/106 |
| 2016/0378108 A1* | 12/2016 | Paczan | G06Q 10/083 705/330 |
| 2017/0011333 A1* | 1/2017 | Greiner | G06K 7/10722 |
| 2017/0011340 A1* | 1/2017 | Gabbai | G05D 1/667 |
| 2017/0015415 A1* | 1/2017 | Chan | G06Q 30/04 |

(56) References Cited

U.S. PATENT DOCUMENTS

| | | | |
|---|---|---|---|
| 2017/0021923 A1* | 1/2017 | Fisher | B64U 70/97 |
| 2017/0021941 A1* | 1/2017 | Fisher | G05D 1/0011 |
| 2017/0021942 A1* | 1/2017 | Fisher | B64U 70/80 |
| 2017/0023949 A1* | 1/2017 | Fisher | G08G 5/55 |
| 2017/0032315 A1* | 2/2017 | Gupta | G06Q 10/08 |
| 2017/0050749 A1* | 2/2017 | Pilskalns | G05D 1/0676 |
| 2017/0073085 A1* | 3/2017 | Tremblay | B64F 1/007 |
| 2017/0081043 A1* | 3/2017 | Jones | B64C 37/02 |
| 2017/0087999 A1* | 3/2017 | Miller | G01C 21/3679 |
| 2017/0096222 A1* | 4/2017 | Spinelli | B64U 80/25 |
| 2017/0100837 A1* | 4/2017 | Zevenbergen | G05D 1/0225 |
| 2017/0113352 A1* | 4/2017 | Lutz | B25J 9/1682 |
| 2017/0117676 A1* | 4/2017 | James | B64U 80/50 |
| 2017/0121023 A1* | 5/2017 | High | B64D 9/00 |
| 2017/0129464 A1* | 5/2017 | Wang | H02J 7/0045 |
| 2017/0129603 A1* | 5/2017 | Raptopoulos | B64F 1/22 |
| 2017/0132558 A1* | 5/2017 | Perez | G06Q 10/083 |
| 2017/0137118 A1* | 5/2017 | Gentry | B64D 1/02 |
| 2017/0137150 A1* | 5/2017 | Conyers | B60K 1/02 |
| 2017/0144776 A1* | 5/2017 | Fisher | B64C 39/024 |
| 2017/0147975 A1* | 5/2017 | Natarajan | G06Q 10/0832 |
| 2017/0152060 A1* | 6/2017 | Morisawa | B64U 50/23 |
| 2017/0154347 A1* | 6/2017 | Bateman | G06Q 10/067 |
| 2017/0158352 A1* | 6/2017 | von Flotow | B64F 1/0295 |
| 2017/0158353 A1* | 6/2017 | Schmick | B60L 53/12 |
| 2017/0166327 A1* | 6/2017 | Schmidt | B64F 1/007 |
| 2017/0167881 A1* | 6/2017 | Rander | B60W 60/0016 |
| 2017/0174335 A1* | 6/2017 | Malloy | B64D 35/021 |
| 2017/0190443 A1* | 7/2017 | Fisher | B64F 1/005 |
| 2017/0193442 A1* | 7/2017 | Ekkel | G06Q 10/083 |
| 2017/0199522 A1* | 7/2017 | Li | G07C 5/0866 |
| 2017/0203632 A1* | 7/2017 | Westendarp | B60H 1/00378 |
| 2017/0203857 A1* | 7/2017 | O'Toole | A47G 29/141 |
| 2017/0225782 A1* | 8/2017 | Kohstall | B64U 30/26 |
| 2017/0225783 A1* | 8/2017 | Fisher | B64U 20/87 |
| 2017/0225799 A1* | 8/2017 | Selwyn | B64F 1/005 |
| 2017/0225801 A1* | 8/2017 | Bennett | B64U 70/90 |
| 2017/0225802 A1* | 8/2017 | Lussier | B64U 10/20 |
| 2017/0240291 A1* | 8/2017 | Kim | H01M 16/006 |
| 2017/0247120 A1* | 8/2017 | Miller | B64U 80/25 |
| 2017/0248948 A1* | 8/2017 | Otani | H04N 23/685 |
| 2017/0253349 A1* | 9/2017 | Wang | B64U 70/97 |
| 2017/0255896 A1* | 9/2017 | Van Dyke | G06Q 10/0835 |
| 2017/0270314 A1* | 9/2017 | Tsybrovskyy | H04W 12/06 |
| 2017/0275025 A1* | 9/2017 | Johnson | B64F 1/12 |
| 2017/0283090 A1* | 10/2017 | Miller | B64U 70/97 |
| 2017/0286905 A1* | 10/2017 | Richardson | G06Q 10/0836 |
| 2017/0300855 A1* | 10/2017 | Lund | B64F 5/10 |
| 2017/0305526 A1* | 10/2017 | Thomassey | B64C 27/26 |
| 2017/0305575 A1* | 10/2017 | Bash | B64F 1/32 |
| 2017/0308850 A1* | 10/2017 | Roush | G01C 21/343 |
| 2017/0313421 A1* | 11/2017 | Gil | B64D 45/04 |
| 2017/0316379 A1* | 11/2017 | Lepek | G06Q 10/047 |
| 2017/0316701 A1* | 11/2017 | Gil | G06Q 10/0832 |
| 2017/0323129 A1* | 11/2017 | Davidson | G05D 1/0234 |
| 2017/0327091 A1* | 11/2017 | Capizzo | B60L 53/68 |
| 2017/0330145 A1* | 11/2017 | Studnicka | G07C 9/00896 |
| 2017/0341769 A1* | 11/2017 | Haberbusch | F17C 5/007 |
| 2017/0345245 A1* | 11/2017 | Torresani | H04W 4/80 |
| 2017/0372256 A1* | 12/2017 | Kantor | G08G 5/34 |
| 2018/0024554 A1* | 1/2018 | Brady | G06Q 10/0833 |
| | | | 701/23 |
| 2018/0039286 A1* | 2/2018 | Tirpak | G05D 1/042 |
| 2018/0053139 A1* | 2/2018 | Stoman | B64U 10/13 |
| 2018/0056794 A1* | 3/2018 | Kim | B60L 53/126 |
| 2018/0088586 A1* | 3/2018 | Hance | G05D 1/0236 |
| 2018/0092345 A1* | 4/2018 | Okumura | F41G 7/2253 |
| 2018/0092484 A1* | 4/2018 | Lewis | G08G 5/54 |
| 2018/0105020 A1* | 4/2018 | Smith | B60H 1/00 |
| 2018/0105271 A1* | 4/2018 | Wypyszynski | B64U 10/13 |
| 2018/0105289 A1* | 4/2018 | Walsh | G06Q 10/1097 |
| 2018/0118340 A1* | 5/2018 | Russo | B64U 50/37 |
| 2018/0118374 A1* | 5/2018 | Lombardini | B64F 3/02 |
| 2018/0127211 A1* | 5/2018 | Jarvis | G05D 1/0285 |
| 2018/0137454 A1* | 5/2018 | Kulkarni | G05D 1/021 |
| 2018/0141682 A1* | 5/2018 | Blake | B64U 70/97 |
| 2018/0194484 A1* | 7/2018 | Livieratos | B64U 10/13 |
| 2018/0196418 A1* | 7/2018 | Meier | G05D 1/0206 |
| 2018/0208070 A1* | 7/2018 | Sanchez | B64U 10/13 |
| 2018/0233055 A1* | 8/2018 | Damnjanovic | G08G 5/57 |
| 2018/0237161 A1* | 8/2018 | Minnick | B64U 50/37 |
| 2018/0245365 A1* | 8/2018 | Wankewycz | B64U 10/13 |
| 2018/0257775 A1* | 9/2018 | Baek | B64U 30/26 |
| 2018/0265196 A1* | 9/2018 | Phillips | B64F 1/20 |
| 2018/0265295 A1* | 9/2018 | Beckman | G08G 5/57 |
| 2018/0265296 A1* | 9/2018 | Beckman | B64U 70/90 |
| 2018/0295327 A1* | 10/2018 | Yearwood | G06V 20/62 |
| 2018/0312276 A1* | 11/2018 | Miller | B64U 10/14 |
| 2018/0319496 A1* | 11/2018 | Zhang | B64U 20/50 |
| 2018/0327091 A1* | 11/2018 | Burks | B64U 50/13 |
| 2018/0354649 A1* | 12/2018 | Ortiz | G08B 13/1436 |
| 2018/0357910 A1* | 12/2018 | Hobbs | G08G 5/54 |
| 2018/0360326 A1* | 12/2018 | Lee | G06F 3/0346 |
| 2018/0364740 A1* | 12/2018 | Collins | G05D 1/0088 |
| 2018/0370618 A1* | 12/2018 | Harris | B64C 25/24 |
| 2018/0370652 A1* | 12/2018 | Vendrame | B64F 1/007 |
| 2019/0002128 A1* | 1/2019 | Raz | B64U 70/99 |
| 2019/0009926 A1* | 1/2019 | Hu | B64U 70/99 |
| 2019/0016476 A1* | 1/2019 | Scherz | H02J 7/00 |
| 2019/0023133 A1* | 1/2019 | Renold | B60L 53/35 |
| 2019/0023416 A1* | 1/2019 | Borko | G06F 3/041 |
| 2019/0028904 A1* | 1/2019 | Carpenter | G08G 5/76 |
| 2019/0047462 A1* | 2/2019 | Vijayaraghavan | B60W 30/00 |
| 2019/0051192 A1* | 2/2019 | Schick | G08G 5/80 |
| 2019/0055018 A1* | 2/2019 | Bei | B64U 70/92 |
| 2019/0100108 A1* | 4/2019 | Davis | B64U 80/84 |
| 2019/0100313 A1* | 4/2019 | Campbell | B64U 10/14 |
| 2019/0100330 A1* | 4/2019 | Cheng | B64U 80/25 |
| 2019/0106224 A1* | 4/2019 | Nishikawa | B64U 50/37 |
| 2019/0108472 A1* | 4/2019 | Sweeney | B64U 70/90 |
| 2019/0127083 A1* | 5/2019 | Di Benedetto | B64D 47/06 |
| 2019/0135403 A1* | 5/2019 | Perry | B64U 10/25 |
| 2019/0152326 A1* | 5/2019 | Nishikawa | B64U 50/19 |
| 2019/0161190 A1* | 5/2019 | Gil | H04L 67/55 |
| 2019/0172358 A1* | 6/2019 | Zhou | G06V 20/17 |
| 2019/0193952 A1* | 6/2019 | Zevenbergen | B60L 53/12 |
| 2019/0217952 A1* | 7/2019 | Zawadzki | B64D 1/02 |
| 2019/0217968 A1* | 7/2019 | Schmidt | B64F 1/007 |
| 2019/0233103 A1* | 8/2019 | High | A47G 29/141 |
| 2019/0233107 A1* | 8/2019 | Tian | B64C 39/12 |
| 2019/0245365 A1* | 8/2019 | Farrahi Moghaddam | B64U 10/14 |
| 2019/0256201 A1* | 8/2019 | Plekhanov | B64U 20/40 |
| 2019/0256202 A1* | 8/2019 | Resnick | B64U 10/13 |
| 2019/0256207 A1* | 8/2019 | Nohmi | G05D 1/0866 |
| 2019/0258910 A1* | 8/2019 | Stoman | G06K 19/06028 |
| 2019/0263519 A1* | 8/2019 | Argus | B64D 31/06 |
| 2019/0270526 A1* | 9/2019 | Hehn | B60L 53/18 |
| 2019/0283871 A1* | 9/2019 | Wieczorek | B64U 10/60 |
| 2019/0291961 A1* | 9/2019 | Urban | G06Q 50/40 |
| 2019/0308724 A1* | 10/2019 | Cooper | B64U 80/25 |
| 2019/0315235 A1* | 10/2019 | Kung | B60L 53/36 |
| 2019/0315463 A1* | 10/2019 | Chen | F24H 15/25 |
| 2019/0337407 A1* | 11/2019 | Wang | B60L 53/31 |
| 2019/0348862 A1* | 11/2019 | Obayashi | B64U 30/21 |
| 2019/0375504 A1* | 12/2019 | Schmalzried | B64U 10/13 |
| 2019/0382134 A1* | 12/2019 | Baklycki | B64F 1/36 |
| 2019/0383052 A1* | 12/2019 | Blake | B60L 53/30 |
| 2020/0003529 A1* | 1/2020 | Benezra | B64U 80/70 |
| 2020/0010214 A1* | 1/2020 | Newcomb | B60L 53/51 |
| 2020/0017218 A1* | 1/2020 | Ahmad | B64D 9/00 |
| 2020/0017237 A1* | 1/2020 | Walker | G08G 5/54 |
| 2020/0031466 A1* | 1/2020 | Anderson | B64U 30/26 |
| 2020/0036243 A1* | 1/2020 | Zhao | H02K 1/145 |
| 2020/0044463 A1* | 2/2020 | Kim | B64U 10/14 |
| 2020/0055613 A1* | 2/2020 | Miller | G05D 1/0676 |
| 2020/0062373 A1* | 2/2020 | Liao | B64U 10/16 |
| 2020/0094957 A1* | 3/2020 | Sohmshetty | B60P 3/11 |
| 2020/0108930 A1* | 4/2020 | Foley | B64U 80/00 |
| 2020/0113167 A1* | 4/2020 | Bouten | A01C 23/008 |
| 2020/0148322 A1* | 5/2020 | Pekrul | B63H 5/02 |
| 2020/0165008 A1* | 5/2020 | Krauss | G05D 1/0676 |
| 2020/0180940 A1* | 6/2020 | Rainville | B64F 1/28 |
| 2020/0189731 A1* | 6/2020 | Mistry | B64C 39/022 |

(56) References Cited

U.S. PATENT DOCUMENTS

| | | | |
|---|---|---|---|
| 2020/0198803 A1* | 6/2020 | Zhou | B64U 70/30 |
| 2020/0207484 A1* | 7/2020 | Foggia | B64U 70/90 |
| 2020/0207485 A1* | 7/2020 | Foggia | B64U 70/90 |
| 2020/0218287 A1* | 7/2020 | Wang | B64U 50/34 |
| 2020/0218288 A1* | 7/2020 | Johnson | B64U 30/26 |
| 2020/0225684 A1* | 7/2020 | Anderson | B64U 70/95 |
| 2020/0239160 A1* | 7/2020 | Cheng | B64U 70/99 |
| 2020/0247540 A1* | 8/2020 | Jones | B64U 7/08 |
| 2020/0262583 A1* | 8/2020 | Ducharme | B64U 70/30 |
| 2020/0272144 A1* | 8/2020 | Yang | B64U 10/14 |
| 2020/0284883 A1* | 9/2020 | Ferreira | G01S 7/4815 |
| 2020/0290752 A1* | 9/2020 | Kolosiuk | B64U 70/95 |
| 2020/0301445 A1* | 9/2020 | Jourdan | G06K 19/06037 |
| 2020/0307829 A1* | 10/2020 | Smith | B64C 25/06 |
| 2020/0309489 A1* | 10/2020 | Kadavanich | F41J 9/08 |
| 2020/0310465 A1* | 10/2020 | Carthew | B64U 70/92 |
| 2020/0324898 A1* | 10/2020 | Youmans | G06V 20/176 |
| 2020/0346736 A1* | 11/2020 | Krasnoff | B64G 1/413 |
| 2020/0346743 A1* | 11/2020 | Bernard | B64C 25/18 |
| 2020/0349852 A1* | 11/2020 | DiCosola | G08G 5/55 |
| 2020/0369384 A1* | 11/2020 | Kelly | G08G 5/32 |
| 2020/0369408 A1* | 11/2020 | Dolata | B60L 53/16 |
| 2020/0398999 A1* | 12/2020 | Ortiz | G07C 9/00563 |
| 2020/0406773 A1* | 12/2020 | Lacaze | B60L 53/35 |
| 2021/0016696 A1* | 1/2021 | Kelly | F16B 2/22 |
| 2021/0031947 A1* | 2/2021 | Wankewycz | B60L 53/51 |
| 2021/0045564 A1* | 2/2021 | Duckers | E06B 3/483 |
| 2021/0047055 A1* | 2/2021 | Lee | B64F 1/22 |
| 2021/0053677 A1* | 2/2021 | Passley | B64U 70/95 |
| 2021/0070468 A1* | 3/2021 | Svirsky | B64U 80/25 |
| 2021/0074170 A1* | 3/2021 | Barker | B64F 1/28 |
| 2021/0086913 A1* | 3/2021 | Friedman | B60L 53/30 |
| 2021/0089055 A1* | 3/2021 | Tran | G06N 3/0495 |
| 2021/0094686 A1* | 4/2021 | Metzner | G08B 13/1965 |
| 2021/0107682 A1* | 4/2021 | Kozlenko | B64U 80/25 |
| 2021/0107684 A1* | 4/2021 | Le Lann | B64F 1/26 |
| 2021/0114729 A1* | 4/2021 | Ragan | B64D 9/00 |
| 2021/0122495 A1* | 4/2021 | Rezvani | B64F 1/007 |
| 2021/0125503 A1* | 4/2021 | Henry | G05D 1/2247 |
| 2021/0127658 A1* | 5/2021 | Luebke | F16C 11/04 |
| 2021/0197983 A1* | 7/2021 | Wang | B64U 80/10 |
| 2021/0214068 A1* | 7/2021 | Bry | B64U 20/83 |
| 2021/0214102 A1* | 7/2021 | Geng | B64U 70/97 |
| 2021/0229805 A1* | 7/2021 | Getman | B64C 27/52 |
| 2021/0237694 A1* | 8/2021 | Hirschvogel | B60J 7/16 |
| 2021/0237899 A1* | 8/2021 | Warwick | B64C 39/024 |
| 2021/0253242 A1* | 8/2021 | Falk-Petersen | B64U 80/40 |
| 2021/0276735 A1* | 9/2021 | Raptopoulos | A47G 29/141 |
| 2021/0284335 A1* | 9/2021 | Mclaughlin | B64U 50/39 |
| 2021/0284356 A1* | 9/2021 | Jourdan | B64F 1/18 |
| 2021/0300591 A1* | 9/2021 | Tian | B64F 1/007 |
| 2021/0309388 A1* | 10/2021 | Ratajczak | B64D 31/00 |
| 2021/0339842 A1* | 11/2021 | Sauer | B64D 27/402 |
| 2021/0347500 A1* | 11/2021 | Hagan | B64U 10/13 |
| 2021/0349456 A1* | 11/2021 | Pham | G05D 1/0676 |
| 2021/0354820 A1* | 11/2021 | Hiller | B60L 53/12 |
| 2021/0371128 A1* | 12/2021 | Rodriguez | A47G 29/141 |
| 2021/0394930 A1* | 12/2021 | O'Toole | A47G 29/141 |
| 2021/0405655 A1* | 12/2021 | Yi | B64U 70/90 |
| 2022/0009647 A1* | 1/2022 | Johannesson | B64U 20/96 |
| 2022/0019247 A1* | 1/2022 | Dayan | G05D 1/104 |
| 2022/0041279 A1* | 2/2022 | Rowse | G05D 1/104 |
| 2022/0041299 A1* | 2/2022 | Wankewycz | B64D 37/30 |
| 2022/0055745 A1* | 2/2022 | Walker | H02G 11/02 |
| 2022/0055770 A1* | 2/2022 | O'Toole | B65G 69/003 |
| 2022/0063798 A1* | 3/2022 | Johnson | B64C 37/02 |
| 2022/0073214 A1* | 3/2022 | Liske | B64F 1/22 |
| 2022/0106125 A1* | 4/2022 | Ragan | F16G 3/10 |
| 2022/0119105 A1* | 4/2022 | Schmalzried | G05D 1/652 |
| 2022/0162001 A1* | 5/2022 | Gherardi | G05D 1/0088 |
| 2022/0163980 A1* | 5/2022 | Beer | G05D 1/228 |
| 2022/0169400 A1* | 6/2022 | Seeley | B64C 1/20 |
| 2022/0169401 A1* | 6/2022 | Di Cosola | B60L 53/51 |
| 2022/0171388 A1* | 6/2022 | Yanagihashi | B65G 43/00 |
| 2022/0177124 A1* | 6/2022 | Marshall | B64U 10/20 |
| 2022/0185501 A1* | 6/2022 | Kempley | B64U 70/70 |
| 2022/0234757 A1* | 7/2022 | Dayan | B64U 70/97 |
| 2022/0242589 A1* | 8/2022 | Pham | G09F 27/005 |
| 2022/0267026 A1* | 8/2022 | Lee | B64F 1/007 |
| 2022/0289376 A1* | 9/2022 | Hayakawa | G05D 1/101 |
| 2022/0306320 A1* | 9/2022 | Howe | B60L 53/00 |
| 2022/0315248 A1* | 10/2022 | Castellano Aldave | B60L 3/00 |
| 2022/0380063 A1* | 12/2022 | Shah | B64U 70/92 |
| 2022/0396373 A1* | 12/2022 | Wang | B64U 50/37 |
| 2022/0396421 A1* | 12/2022 | Tian | B62D 63/061 |
| 2023/0017530 A1* | 1/2023 | Lowe | H01M 10/613 |
| 2023/0023246 A1* | 1/2023 | McLaughlin | G05D 1/0088 |
| 2023/0031028 A1* | 2/2023 | Ehasoo | B64F 1/222 |
| 2023/0044050 A1* | 2/2023 | Cevacins | B64U 70/99 |
| 2023/0045483 A1* | 2/2023 | Ahn | G05D 1/689 |
| 2023/0045691 A1* | 2/2023 | Cevacins | B64U 60/00 |
| 2023/0046127 A1* | 2/2023 | Guerra Johansson | H04N 7/183 |
| 2023/0063715 A1* | 3/2023 | Bell | G05D 1/0246 |
| 2023/0065140 A1* | 3/2023 | Blevins | B64U 20/40 |
| 2023/0074715 A1* | 3/2023 | Kwon | F04D 25/08 |
| 2023/0088830 A1* | 3/2023 | Kim | B64U 50/32 244/221 |
| 2023/0096139 A1* | 3/2023 | Ubaldi | B65G 23/44 198/844.1 |
| 2023/0100169 A1* | 3/2023 | Laczak | B64F 1/125 232/1 R |
| 2023/0133068 A1* | 5/2023 | Wiegman | B60L 53/62 320/109 |
| 2023/0140387 A1* | 5/2023 | Infanti | B64F 1/60/50 244/114 R |
| 2023/0159192 A1* | 5/2023 | Gil | B64U 80/40 244/137.1 |
| 2023/0202680 A1* | 6/2023 | Yehya | B64U 70/30 244/110 E |
| 2023/0202682 A1* | 6/2023 | Kiyokami | B64U 70/90 244/114 R |
| 2023/0202691 A1* | 6/2023 | Kiyokami | B64U 70/93 244/114 R |
| 2023/0244249 A1* | 8/2023 | Smith | G01S 13/933 701/11 |
| 2023/0249851 A1* | 8/2023 | Tian | B64U 80/10 414/787 |
| 2023/0257139 A1* | 8/2023 | Straus | B64U 10/13 244/114 R |
| 2023/0298268 A1* | 9/2023 | Oleynikova | B60W 30/09 |
| 2023/0303272 A1* | 9/2023 | Passley | B64U 70/00 |
| 2023/0348106 A1* | 11/2023 | Berthelet | H05K 7/20154 |
| 2023/0349146 A1* | 11/2023 | Vasconi | B66B 9/00 |
| 2023/0373626 A1* | 11/2023 | Kiyokami | B64D 1/22 |
| 2023/0373668 A1* | 11/2023 | Kozlenko | G05D 1/0055 |
| 2023/0399132 A1* | 12/2023 | Kiyokami | B64C 39/024 |
| 2024/0002080 A1* | 1/2024 | Shi | B64F 1/362 |
| 2024/0010368 A1* | 1/2024 | Liao | B64U 80/10 |
| 2024/0067371 A1* | 2/2024 | Turner | B64U 50/37 |
| 2024/0076067 A1* | 3/2024 | Takahashi | B64U 10/60 |
| 2024/0076072 A1* | 3/2024 | Arii | B64U 10/14 |
| 2024/0101286 A1* | 3/2024 | Regev | B64U 70/20 |
| 2024/0101287 A1* | 3/2024 | Takahashi | B64U 80/86 |
| 2024/0101288 A1* | 3/2024 | Takahashi | B64U 70/92 |
| 2024/0109656 A1* | 4/2024 | Stege | G06Q 10/083 |
| 2024/0132238 A1* | 4/2024 | Qiu | B64U 70/92 |
| 2024/0140630 A1* | 5/2024 | Lee | B64U 80/40 |
| 2024/0158112 A1* | 5/2024 | Le Lann | H01M 50/262 |
| 2024/0176367 A1* | 5/2024 | Zhou | G08G 5/22 |
| 2024/0190593 A1* | 6/2024 | Shah | B60L 53/14 |
| 2024/0262545 A1* | 8/2024 | Fu | B64U 80/20 |
| 2024/0278946 A1* | 8/2024 | Roberts | B64U 70/92 |
| 2024/0300677 A1* | 9/2024 | Sercel | B64G 1/623 |
| 2024/0336378 A1* | 10/2024 | Neate | B64U 10/60 |
| 2024/0343426 A1* | 10/2024 | Cornew | B64U 80/25 |
| 2024/0384587 A1* | 11/2024 | Anderson | B64U 70/90 |
| 2024/0391616 A1* | 11/2024 | Dayan | B64U 70/90 |
| 2024/0425199 A1* | 12/2024 | Li | G05D 1/042 |
| 2025/0002185 A1* | 1/2025 | Liu | B64U 80/70 |
| 2025/0011017 A1* | 1/2025 | Kim | B64U 50/19 |
| 2025/0026509 A1* | 1/2025 | Infanti | B64U 70/50 |
| 2025/0074632 A1* | 3/2025 | DiCosola | G07F 15/006 |
| 2025/0076040 A1* | 3/2025 | Sandall | B64C 13/16 |

(56) References Cited

U.S. PATENT DOCUMENTS

| | | | |
|---|---|---|---|
| 2025/0108935 A1* | 4/2025 | Johnson | B60L 53/22 |
| 2025/0108943 A1* | 4/2025 | Sekiguchi | B64U 80/20 |
| 2025/0121966 A1* | 4/2025 | Gronstedt | B64U 80/70 |
| 2025/0128638 A1* | 4/2025 | Scheler | B60L 53/30 |
| 2025/0145314 A1* | 5/2025 | Gronstedt | B64F 1/32 |
| 2025/0185139 A1* | 6/2025 | Spiro | H01F 41/041 |
| 2025/0187761 A1* | 6/2025 | Yamakawa | B64U 70/90 |
| 2025/0206463 A1* | 6/2025 | Aralis | B64F 1/362 |
| 2025/0223061 A1* | 7/2025 | Merdin | B64U 80/25 |
| 2025/0224541 A1* | 7/2025 | Quist | G06V 20/17 |
| 2025/0250006 A1* | 8/2025 | Burgess | G05D 1/0094 |
| 2025/0289598 A1* | 9/2025 | Byers | B64U 80/10 |

* cited by examiner

AERIAL VEHICLE LANDING PAD WITH SENSORS

BACKGROUND

Aerial vehicles perform a landing operation during each flight. This operation has a chance of causing damage to the vehicle, the surrounding environment, or both. For example, if an aerial vehicle, such as a drone or unmanned aerial vehicle (UAV) deviates from an intended landing location (e.g., a target location), then the aerial vehicle may unintentionally make contact with a structure, land on uneven terrain, and/or otherwise interfere with the environment, people, or adversely impact the aerial vehicle.

Aerial vehicles require frequent maintenance to remain flight-worthy. Often, aerial vehicles are monitored in different ways during flight by various sensors to determine a health of the vehicle. However, sensors onboard an aerial vehicle add weight and complexity to the aerial vehicles. Further, some information cannot be reliably obtained by onboard sensors. Sensor data may indicate stresses on an aerial vehicle, as well as other factors such as possible damage to an airframe and/or other components of an aerial vehicle. The sensor data may be used for decision making purposes, such as maintenance decisions, redeployment decisions, and other operational considerations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
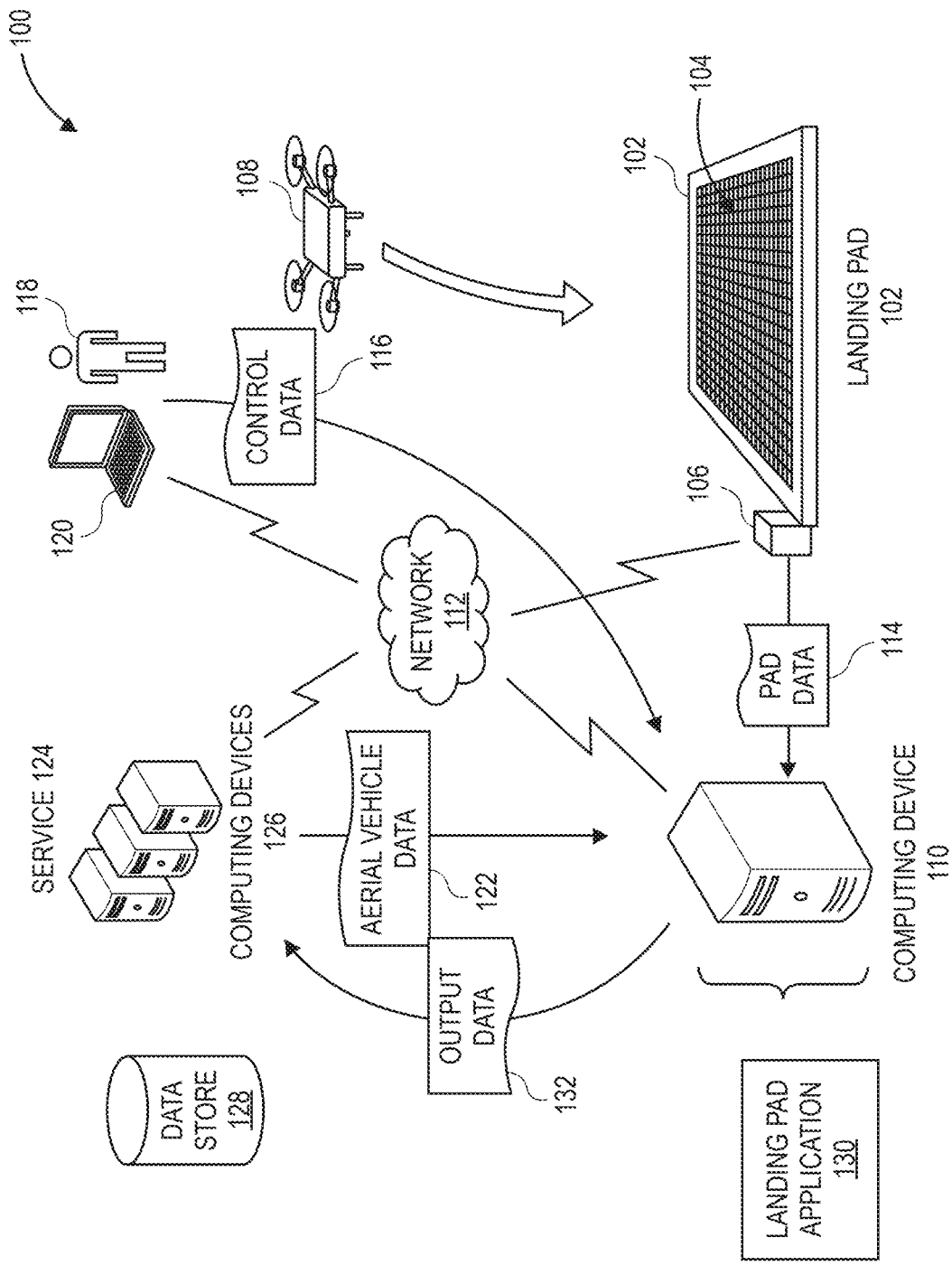
FIG. 1 is a schematic diagram of an illustrative environment that includes an exemplary aerial vehicle landing pad, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an aerial vehicle landing pad configured to capture various metrics regarding landing of an aerial vehicle thereon. The landing pad may be used for testing purposes to determine landing characteristics of aerial vehicles. In some instances, the landing pad may be deployed to measure repeat landings of aerial vehicles, such as to measure and monitor health of vehicles based at least in part on characteristics of landings on the landing pad. The landing pad may be used to detect aspects of a landing on the landing pad in preparation for additional tasks, such as automated movement of the aerial vehicle and/or loading and/or unloading of batteries and/or payload.

The landing pad may be configured with elements that are arranged in a grid. The grid may be square-shaped, substantially circular, or may have other shapes (e.g., hexagon) as viewed from above during a landing operation. The elements, as viewed from above, may be shaped as squares, hexagons, or other repeating shapes that form a continuous grid of elements. The landing pad may be formed of layers, such as sensors layers enclosed within protective layers. The landing pad may be flexible, such that the landing pad follows a contour of the ground or supporting material underneath the landing pad. In some embodiments, the landing pad may be configured for portability, such as by enabling the landing pad to be folded or rolled up to case transport of the landing pad to a different location. However, the landing pad may include some rigidity.

In accordance with various embodiments, the landing pad may include pressure sensors arranged as discrete elements in a grid. When an aerial vehicle is resting or otherwise touching or engaging the landing pad, elements that directly contact landing structures (e.g., landing gear) of the aerial vehicle may detect pressure applied by the aerial vehicle against the landing pad. The location of these elements that detect pressure may be used to determine various information about the aerial vehicle, such as a landing location of the aerial vehicle on the landing pad, a deviation from the landing location to a target location on the landing pad, an orientation of the aerial vehicle on the landing pad (i.e., which way the aerial vehicle landing pad is facing with respect to a reference direction), and/or a type of aerial vehicle based on a known "footprint" of a type of aerial vehicle (e.g., based on a known configuration of the landing structures of the aerial vehicle).

In some embodiments, the landing pad may include force sensors in the discrete elements in the grid. The force sensors may detect a force of landing of the aerial vehicle during a landing operation. The force sensors may also determine characteristics of a landing or other information based on a distribution of forces measured by the various elements that interact with the aerial vehicle during landing. For example, if the aerial vehicle includes three landing structures (e.g., legs) and those landing structures exert a force on three corresponding elements, each element may generate a force signal as {element 1, F1}, {element 2, F2}, and {element 3, F3}. If the values for F1, F2, and F3 are similar, then the aerial vehicle has landed relatively level. However, if one of the values F1, F2, and F3 is significantly greater than other force values (e.g., a factor of 50% greater, etc.), than the aerial vehicle may not have landed relatively level, but instead has landed primarily on a single landing structure, which in turn generated a greater force on both that single landing structure and the corresponding element under that landing structure during landing.

The landing pad may include other sensors, such as environmental sensors that measure environmental conditions before, during, and/or after landing of the aerial vehicle. The environmental sensors may capture temperature, barometric pressure, windspeed, humidity, precipitation, and/or other environmental conditions that may impact landing of the aerial vehicle on the landing pad. The landing pad may also include an apparatus to measure a distance from the landing pad surface to an approaching aerial vehicle, such as using a lidar apparatus or another distance measurement apparatus. The landing pad may also include a microphone to capture sound emitted by the aerial vehicle during landing.

The aerial vehicle landing pad may include a sensor hub that routes signals from the various sensors for distribution to a computing device for further processing, such as to process pressure signals, force signals, and/or environmental signals. The computing device may access additional information related to the landing of the aerial vehicle, such as control data provided to the aerial vehicle during the landing. For example, the aerial vehicle may be an unmanned aerial vehicle (e.g., drone) and may be piloted by a human operator issuing controls to the aerial vehicle during the landing operation. Those controls may be made accessible to the computing device and may be associated with other data and signals captured during the landing of the aerial vehicle. This information may be used to improve landing, train human operators, inform future landings of other aerial vehicles on landing pads, used for troubleshooting, determine a time required to land an aerial vehicle on the landing pad, and/or for other purposes as disclosed herein.

FIG. 1 is a schematic diagram of an illustrative environment that includes an exemplary aerial vehicle landing pad, according to an implementation. The environment 100 may include an aerial vehicle landing pad 102 (or "landing pad 102") including a plurality of elements 104. The elements 104 may be formed as a grid. The grid may span a width to accommodate landing of an aerial vehicle 108 thereon with an appropriate safety factor or buffer for deviations in landing locations. For example, the grid may span approximately 23 feet (e.g., width or diameter) to accommodate landing of an unmanned aerial vehicle (e.g., drone) configured to deliver packages to customers where the aerial vehicle spans approximately 2-3 feet when viewed from above. However, other landing pads of other sizes may be used for different sized aerial vehicles. Each element of the elements 104 may include one or more sensors, such as a pressure sensor and/or force sensor. The sensors may generate signals during or after landing of the aerial vehicle 108, which may be routed to a sensor hub 106. The sensor hub may be organized to output the signals with a known location of an element associated with detection of the signal. Thus, when a force or pressure is applied to a certain element, the location of that element is known based on the arrangement of the grid and output of the signals.

The environment 100 may include a computing device 110. The computing device 110 may be in communication with the sensor hub 106 and/or other devices via one or more networks 112. The networks 112 may include wireless and/or wired networks, and may be wide area networks, local networks, mobile networks, and/or any other type of networks that facilitate exchange of data. The computing device 110 may receive pad data 114 from the sensor hub 106, which may indicate pressure and/or force for corresponding elements having a known location on the grid of the landing pad 102. In some embodiments, the sensor hub 106 may output other sensor data, such as sensor data from one or more environmental sensors, microphones, distance measuring devices, and/or from other sensors that capture information before, during, and/or after landing of the aerial vehicle 108 on the landing pad 102.

The computing device 110 may receive control data 116 that includes flight controls of the aerial vehicle 108. The control data 116 may be generated at least in part by a human operator 118 via a user device 120. For example, the human operator 118 may provide flight controls to the aerial vehicle 108 during a landing process to cause an unmanned aerial vehicle (e.g., a drone) to land under human control on the landing pad 102. However, the flight controls may be generated by the aerial vehicle in some embodiments, or by combination of the aerial vehicle and an operator.

The computing device 110 may receive aerial vehicle data 122 from a service 124 via computing devices 126. The aerial vehicle data 122 may be stored in a data store 128 along with other data about other aerial vehicles. For example, the data store 128 may store vehicle information, such as configurations of different aerial vehicles (e.g., types of vehicles, footprint of landing gear, specifications, etc.). The data store 128 may include health data regarding health of one or more aerial vehicles, such as a fleet of vehicles. The health data may include a number of landings, sensor data indicating use of the aerial vehicle (e.g., flight time, etc.), stresses on the aerial vehicle (possibly measured by the landing pad 102 as discussed herein), and/or other data.

The computing device 110 may include a landing pad application 130. The landing pad application 130 may receive one or more of the pad data 114, the control data 116, and/or the aerial vehicle data 122. The landing pad application 130 may determine various information based on the sensor data including in the pad data 114, such a type of aerial vehicle that has landed on the landing pad 102, an orientation of the aerial vehicle on the landing pad after the landing operation, a force of impact of the aerial vehicle on the landing pad 102 during landing, environmental conditions, and/or other data. The landing pad application 130 may aggregate at least some of the pad data or data derived therefrom with the control data 116 to enable analysis of a specific landing, such as to train human operators, evaluate human operators, troubleshoot land mistakes, evaluate landing protocols, evaluate aerial vehicle performance and/or vehicle health, or for other reasons. The aerial vehicle data 122 may be used to help identify a type of aerial vehicle that lands on the landing pad 102 as discussed below while also possibly providing other relevant data about a particular aerial vehicle (e.g., payload weight, etc.).

The computing device 110, by way of the landing pad application 130, may provide output data 132 to the service 124, via the computing devices 126. The output data 132 may include information identifying an aerial vehicle that landed on the landing pad 102, attributes of the landing (e.g., forces, environmental conditions, temporal information, sound, etc.), location and/or orientation of the aerial vehicle on the landing pad 102, and/or other information. In some embodiments, the service 124 may use the output data 132 to monitor and/or track vehicle health of the aerial vehicle that landed on the landing pad. In various embodiments, the service may use the output data to inform other applications, such as an application to provide services to an aerial vehicle after the landing on the pad (e.g., to move the aerial vehicle from the landing pad 102, to extract a battery from or add a battery to the aerial vehicle, to extract payload from or add payload to the aerial vehicle, and so forth).

In some embodiments, the landing pad 102 may communicate with the aerial vehicle 108. For example, the landing pad 102 may be equipped with lights, a radio transmitter, or other hardware to enable the landing pad 102 to communicate with the aerial vehicle 108, such as to indicate to the aerial vehicle 108 that the landing pad 102 is clear for landing upon, directing the aerial vehicle 108 to initiate a landing on the landing pad 102, directing the aerial vehicle 108 to land on another landing pad, and/or providing other information to the aerial vehicle 108. The landing pad 102 may be configured to receive communications from the aerial vehicle 108, such as radio signals and/or optical signals. For example, the aerial vehicle 108 may indicate a type of aerial vehicle or other identifying information, indicate a start of a landing process, indicate initiation of human control of the aerial vehicle, or other information, which may be received by the landing pad 102. The landing pad 102 may receive control signals that are used to control the aerial vehicle, such as by receiving the control signals as radio signals.

Figure 2A:
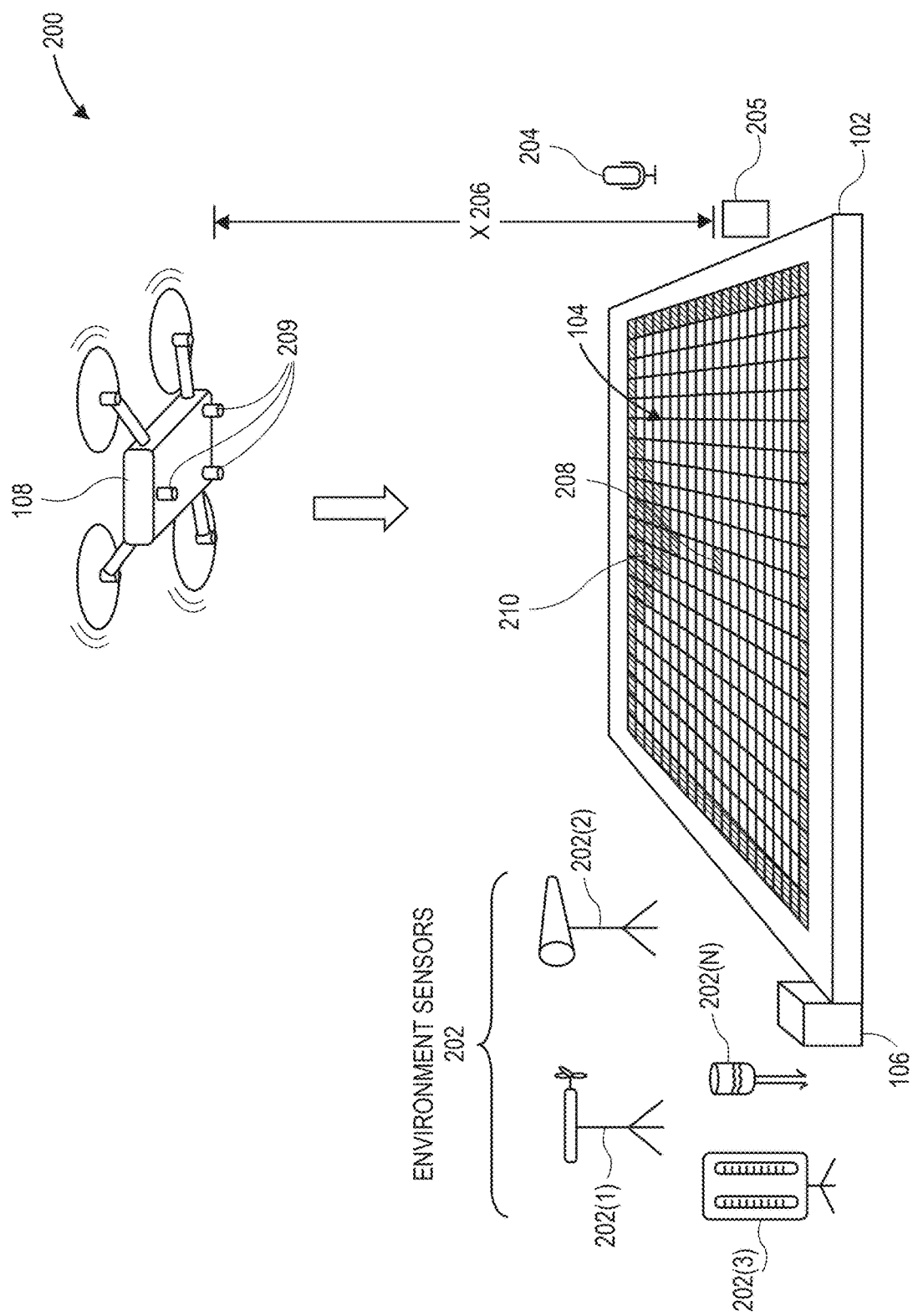
FIGS. 2A-2F are schematic diagrams of an illustrative aerial vehicle landing pad, according to various implementations.

FIGS. 2A-2F are schematic diagrams of the illustrative aerial vehicle landing pad 102, according to various implementations. Turning to FIG. 2A, an environment 200 includes the landing pad 102 with the elements 104 arranged in a rectangular grid shape, which may be a square shape as viewed from above the landing pad. The environment 200 depicts the aerial vehicle 108 in flight just prior to landing on the landing pad 102. As discussed above, the landing pad 102 may include various sensors included in the elements 104. For example, each element may include a pressure sensor and/or a force sensor. The various sensors may output signals to the sensor hub 106, which may enable capture of a signal and a location of origin of the signal in the grid (e.g., which element output the signal and where that element is located in the grid, possibly in relation to reference points on the grid). The element may not explicitly output location data, rather the location may be determined based on a physical layout of the grid of elements, such as using a Cartesian coordinate system for locations of elements in the grid that is mapped to output of signals (e.g., signal {2,4} is located at location {2,4}, etc.).

The environment 200 includes a variety of possible environmental sensors 202 that are configured to measure environmental conditions before, during, and/or after landing of the aerial vehicle 108 on the landing pad 102. The environmental sensors may output signals to the sensor hub 106. A non-exclusive list of possible environmental sensors includes a wind speed measuring device 202(1) (e.g., an anemometer), wind sock 202(2), one or more gauges 202(3) (e.g., a barometer, thermometer, hygrometer, etc.), a precipitation gauge 202(N) and/or other environmental sensors.

The environment 200 may include one or more microphone(s) 204 to measure sounds before, during, and/or after landing of the of the aerial vehicle 108 on the landing pad 102. For example, the microphone(s) 204 may capture an amount of sound generated during landing of an aerial vehicle, provide data indicating that the aerial vehicle has powered down (e.g., is substantially silent), etc. The microphone(s) 204 may output signals to the sensor hub 106.

The environment 200 may include a range measuring device 205, such as a lidar (or LiDAR) device for light detection and ranging. The range measuring device may be implemented using other ranging apparatus to measure a distance 206 of the aerial vehicle from a surface of the landing pad 102, such as an array of cameras. The distance may be compared to a threshold distance, which may initiate capture and/or transmission of data by the sensor hub 106. For example, when the aerial vehicle is within X distance from the landing pad, various sensors may initiate gathering signal data, etc.

In various embodiments, the range measuring device, when implemented as a camera, or other devices may determine a unique identifier of the aerial vehicle, such as a quick read (QR) code or other image code, character-based code, etc. The unique identifier may be used to associate data with the specific aerial vehicle, such as health data. The unique identifier may be determined by other devices, such as a radio frequency identifier (RFID), near field detector, or other devices used to access or read a unique identifier.

The aerial vehicle 108 may include landing structures 209 (e.g., landing gear) that contact the elements 104 on the landing pad 102 during landing. The landing structures 209 may apply force and/or pressure to specific elements of the elements 104, which may enable detection of a location of the aerial vehicle 108 on the landing pad 102 after landing, as discussed below.

The landing pad 102 may include various indicia, which may include a target landing location 208, reference points 210, a border, and/or other information for use to guide landing of the aerial vehicle on the landing pad 102 (e.g., by the human operator, by a visual landing system, an automated landing system, etc.), used to reference a landing location and/or orientation of the aerial vehicle on the landing pad 102, and/or used for other reasons discussed herein.

As discussed above, the landing pad 102 may include lights, such as around a perimeter of the grid, which may be selectively activated to provide information to the aerial vehicle 108. The sensor hub 106 may include a radio transmitter or transceiver to provide radio signals to the aerial vehicle. Thus, the landing pad 102 may be configured to communicate with the aerial vehicle using radio signals and/or light signals. In some embodiments, the landing pad 102 may include a radio receiver and/or an optical sensor (e.g., a camera) to receive radio signals and/or optical/light signals from the aerial vehicle 108.

Figure 2B:
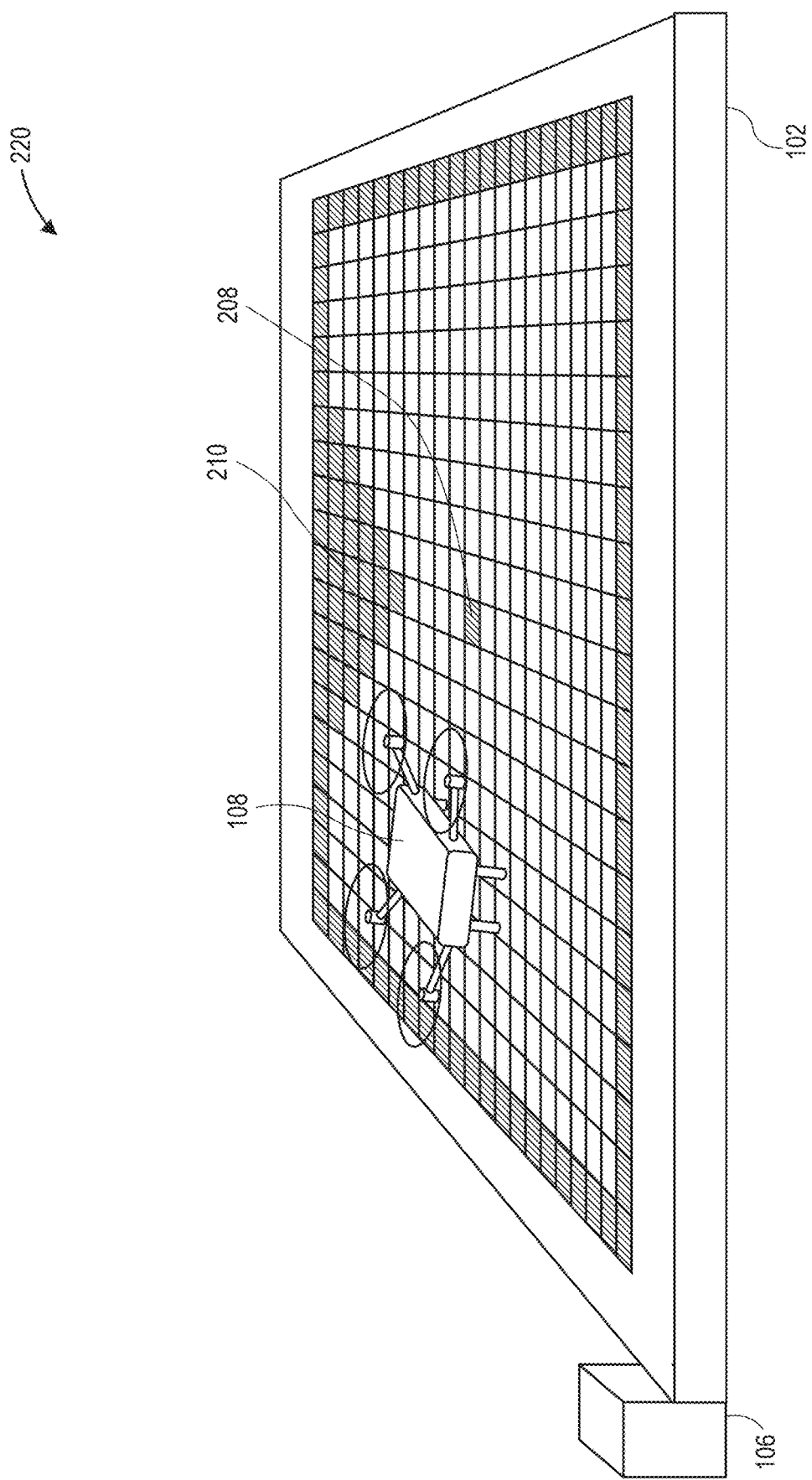

Turning to FIG. 2B, an environment 220 shows the aerial vehicle 108 after landing on the landing pad 102. The aerial vehicle may be located at a landing location on the landing pad, which may be relative to the target landing location 208 and the reference points 210. The landing structures 209 of the aerial vehicle 102 may contact specific elements of the elements 104. During landing of the aerial vehicle shown in FIG. 2B, the aerial vehicle may exert a force on respective elements that engage with the landing structures 209. After landing on the landing pad 102, the landing structures 209 may exert a force, measured as pressure, on the respective elements.

Figure 2C:
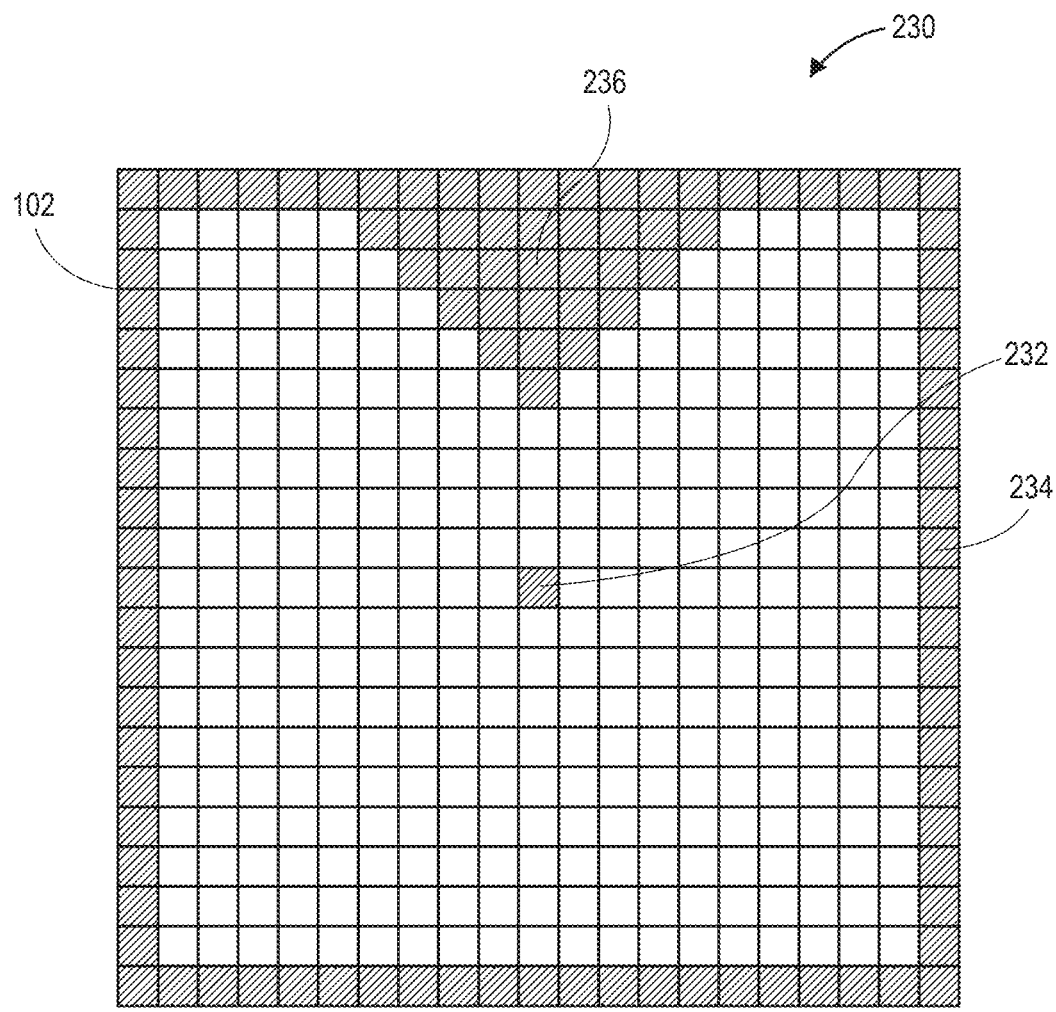

Turning to FIG. 2C, a top elevation of the landing pad is shown in environment 230 prior to landing of the aerial vehicle. The landing pad 102 includes a target location 232, which may be a center of the landing pad 102 or near a center of the landing pad 102. The target location 232 may be a reference location used to determine a deviation of an actual landing location of the aerial vehicle on the landing pad 102. The target location 232 may include a directional component and may be shown as an arrow or other shape with a directional component. The landing pad 102 includes a border reference 234. The border reference 234 may be used for navigation by the aerial vehicle and/or by a human operator to help identify the landing pad 102 or a boundary of the landing pad 102. The border reference 234 may be used as a buffer zone to determine that the aerial vehicle has landed too far from the target location 232. The border reference 232 may not be continuous around the perimeter of the landing pad 102, but may indicate critical locations, such as a general outline of the landing pad 102, for example.

The landing pad 102 may include reference points 236. The reference points 236 may indicate a directional component and may be shaped in the form of an arrow or other directional shape. The reference points 236 may be included as one or more indicia on the landing pad 102. The reference points 236 may be used to determine a reference orientation of the aerial vehicle after landing on the landing pad 102. The reference points 236 may be used to determine a reference location of the aerial vehicle after landing on the landing pad 102. In some embodiments, the reference points 236 may provide a unique identifier or other designator of the landing pad 102. For example, an area may have multiple landing pads, each having different reference points 236 to enable the aerial vehicle or human operator to determine an assigned landing pad to land the aerial vehicle upon.

Figure 2D:
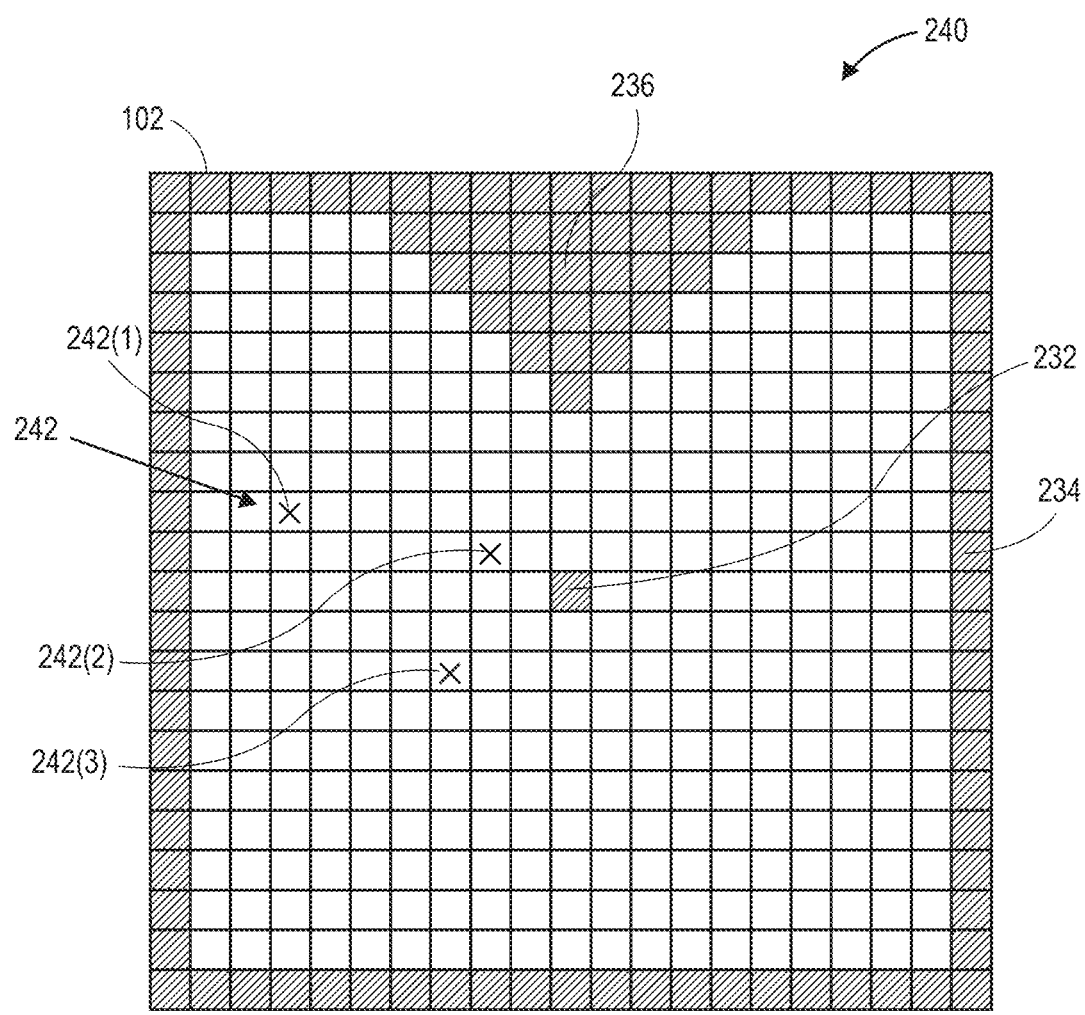

FIG. 2D shows a top elevation of the landing pad in environment 240 after landing of the aerial vehicle depicted by way of "x" marks on engaged elements 242 that are certain elements of the landing pad 102 that touch the landing structure (e.g., the landing structure 209) of the aerial vehicle. For example, a first landing structure of the aerial vehicle may engage a first element 242(1) of the elements. A second landing structure of the aerial vehicle may engage a second element 242(2) of the elements. A third landing structure of the aerial vehicle may engage a third element 242(3) of the elements. More landing structures and engaged elements may exist in some implementations, depending on configuration of the landing structures of the aerial vehicle.

The locations of the engaged elements 242 on the grid of the landing pad 102 may be detected by pressure sensors in the respective elements. The pressure sensors may provide pressure signals to the sensor hub, which may be correlated with a location of the respective elements on the grid. The relative locations of the engaged elements 242 may create a graphical footprint, depicted as a triangle of elements that corresponds to the location of the landing structures of the aerial vehicle resting on the landing pad. This graphical footprint may be used to determine a landing location of the aerial vehicle, possibly using a centroid or other reference location derived from the engaged elements 242 for the target location, relative to the target location 232. The graphical footprint may be used to determine an orientation of the aerial vehicle relative to the reference points 236 and possibly a type of aerial vehicle as discussed below with reference to FIGS. 2E and 2F.

The engaged elements 242 may provide force signals to the sensor hub, which may be used to determine a force of a landing of the aerial vehicle on the landing pad 102. Force sensors may also determine characteristics of a landing or other information based on a distribution of forces measured by the engaged elements 242 that interact with the aerial vehicle during landing. For example, if the aerial vehicle includes three landing structures (e.g., legs) and those landing structures exert a force on three corresponding elements, each element may generate a force signal as {first element 242(1), F1}, {second element 242(2), F2}, and {third element 242(3), F3}. If the values for F1, F2, and F3 are similar, then the aerial vehicle has landed relatively level with substantially similar force exerted by each landing structure into the respective engaged elements 242. However, if one of the values F1, F2, and F3 is significantly greater than other force values (e.g., a factor of 50% greater, etc.), than the aerial vehicle has not landed relatively level, but instead has landed primarily on fewer landing structures (e.g., a single landing structure), which in turn generated a greater force on both those fewer landing structures and the corresponding element(s) under that landing structure during landing.

Figure 2E:
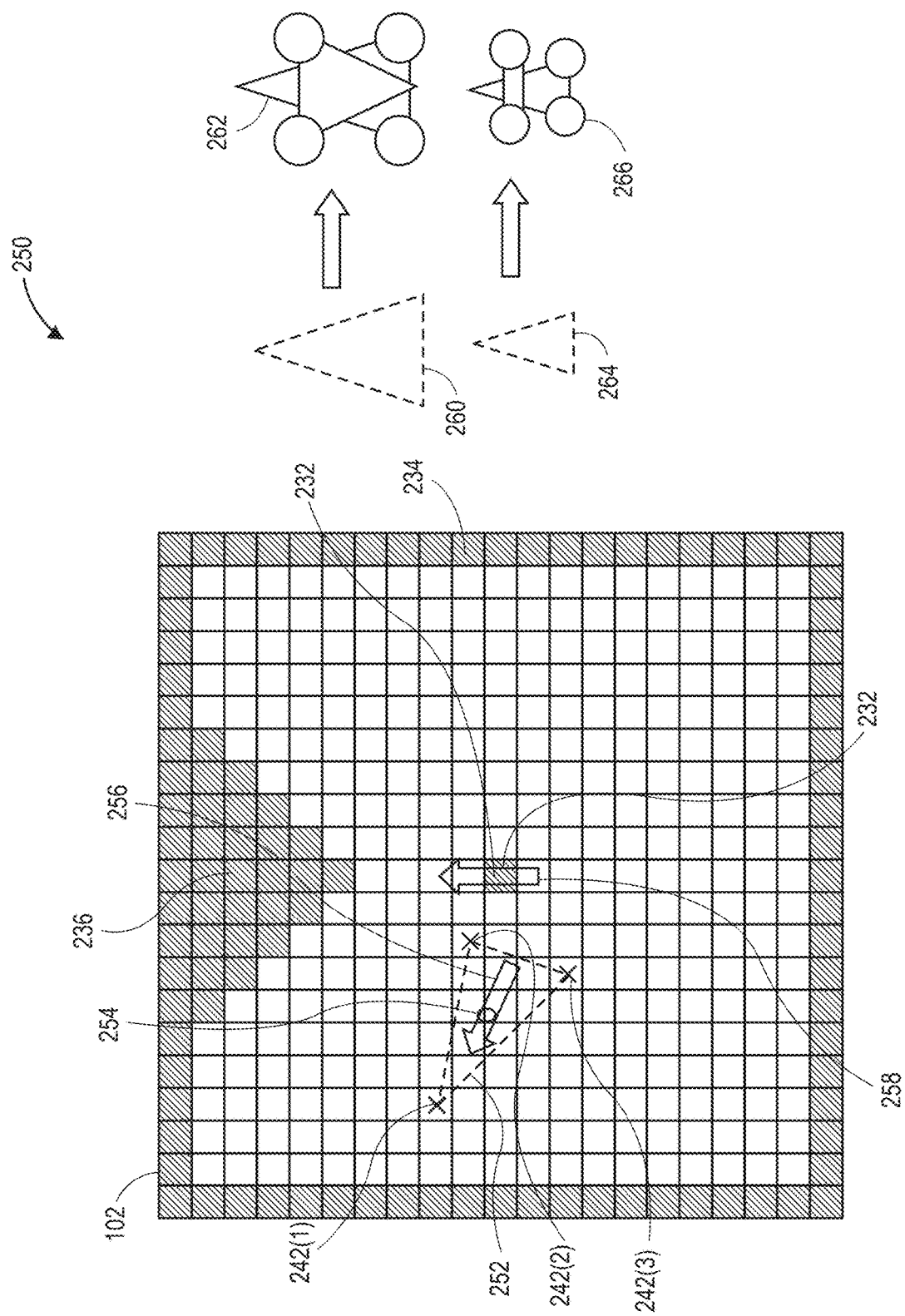

Turning to FIG. 2E, an environment 250 shows a graphical footprint 252. The graphical footprint 252 may be represented as a connection of lines from locations of the engaged elements 242, which form a triangle in this representation shown in the environment 250, however other shapes may be shown depending on the layout of the landing structures of the aerial vehicle that lands on the landing pad 102. The graphical footprint 252 may be used to determine a landing location 254 of the aerial vehicle. The landing location 254 may be a centroid or other reference location derived from the graphical footprint 252. The graphical footprint 252 may be used to generate an outline of an expected perimeter of the aerial vehicle located on the landing pad 102. This may assist in interaction with the aerial vehicle such as to move the aerial vehicle and/or interact with payload, batteries, etc. The graphical footprint 252 may be used to determine an orientation 256 of the aerial vehicle, possibly in reference to a reference orientation 258. The reference orientation 258 may be based on the target location 232 and/or the reference points 236.

In various embodiments, the graphical representation 252 may be associated with one of known graphical representations associated with respective types of aerial vehicles. In this manner, the graphical representation 252 derived from the engaged elements 242 may be used, possibly in conjunction with other data, to determine a type of aerial vehicle that has landed on the landing pad 102. The known graphical representations may include a first graphical representation 260 associated with a first type of aerial vehicle 262, a second graphical representation 264 associated with a second type of aerial vehicle 266, and so forth. In the environment 250, the graphical representation 252 matches the first graphical representation 260 that is associated with the first type of aerial vehicle 262. Thus, data derived from signals from the elements of the landing pad may be used to determine that the aerial vehicle that landed on the landing pad is the first type of aerial vehicle 262. Other data may be used to assist in determining the type of aerial vehicle in addition to the graphical representation 252 or instead of the graphical representation 252, such as a weight of the aerial vehicle derived from the pressure signals, communications from the aerial vehicle received via the landing pad 102 (e.g., a sequence of flashing lights, a radio signal, etc.), or other attributes of the landing of the aerial vehicle. For example, two different types of aerial vehicles may have the same graphical representation but may have different weights. These aerial vehicles may be identified upon landing on the landing pad 102 based on their graphical representation and weight. The weight may be an estimate based on pressure signals generated in response to contact by landing structures of the aerial vehicle.

Figure 2F:
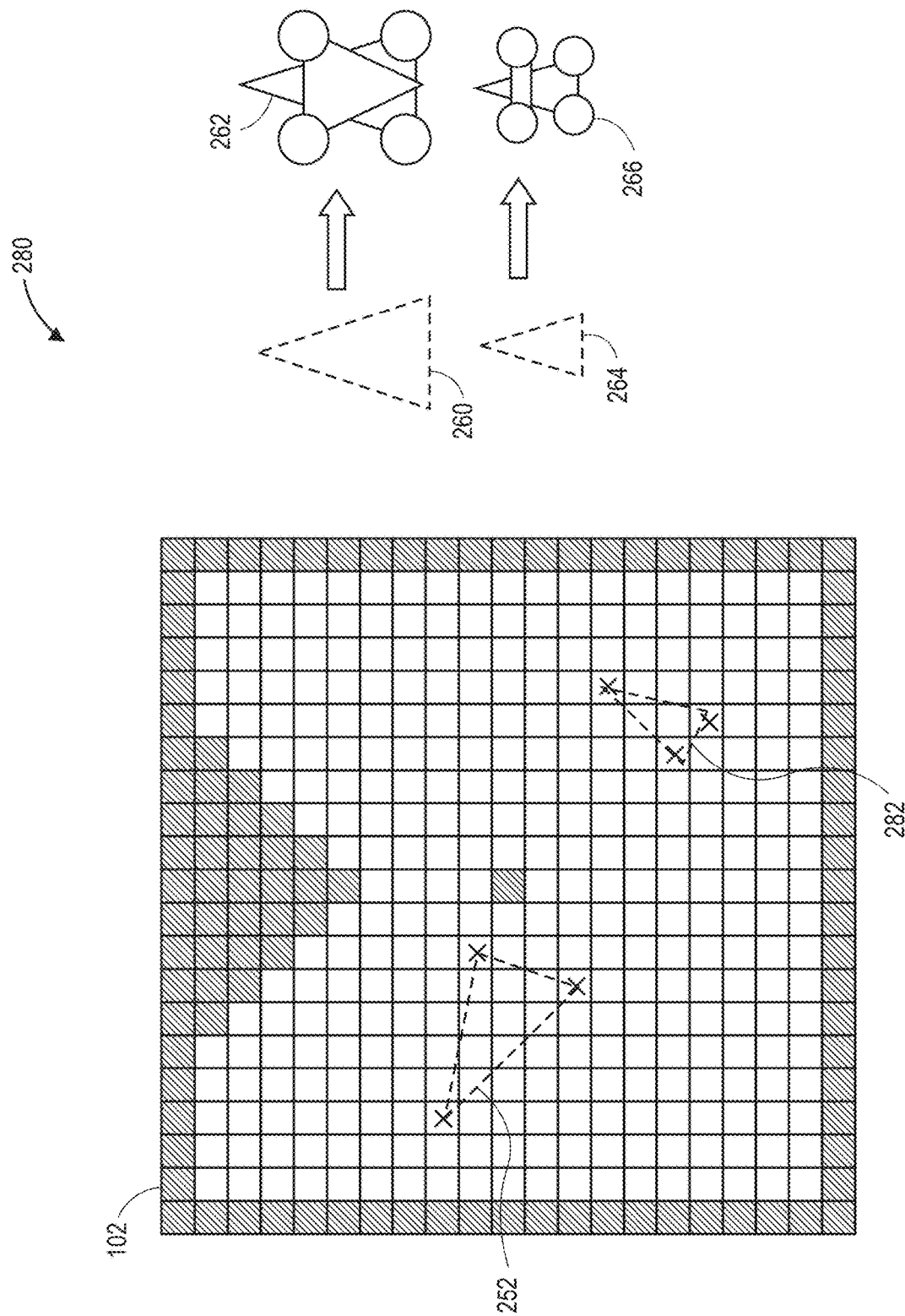

Turning to FIG. 2F, the environment 280 shows a different graphical footprint 282. The different graphical footprint 282 may be determined by pressure signals of different engaged elements on the grid of the landing pad, such as at a different time (possibly prior to landing of the aerial vehicle associated with the graphical footprint 252). In the environment 280, the graphical representation 282 matches the second graphical representation 264 that is associated with the second type of aerial vehicle 266. Thus, data derived from signals from the elements of the landing pad may be used to determine that the other aerial vehicle that landed on the landing pad is the second type of aerial vehicle 266. Typically, the landing pad 102 is configured for having only a single aerial vehicle on the landing pad at any given time. However, the landing pad may be designed to accommodate multiple aerial vehicles on the landing pad at a same time. When multiple aerial vehicles are on the pad, the type of vehicle may be determined in a similar manner while using temporal data about when the pressure is detected by the engaged elements to enable grouping of the engaged elements to form different graphical footprints.

Figure 3:
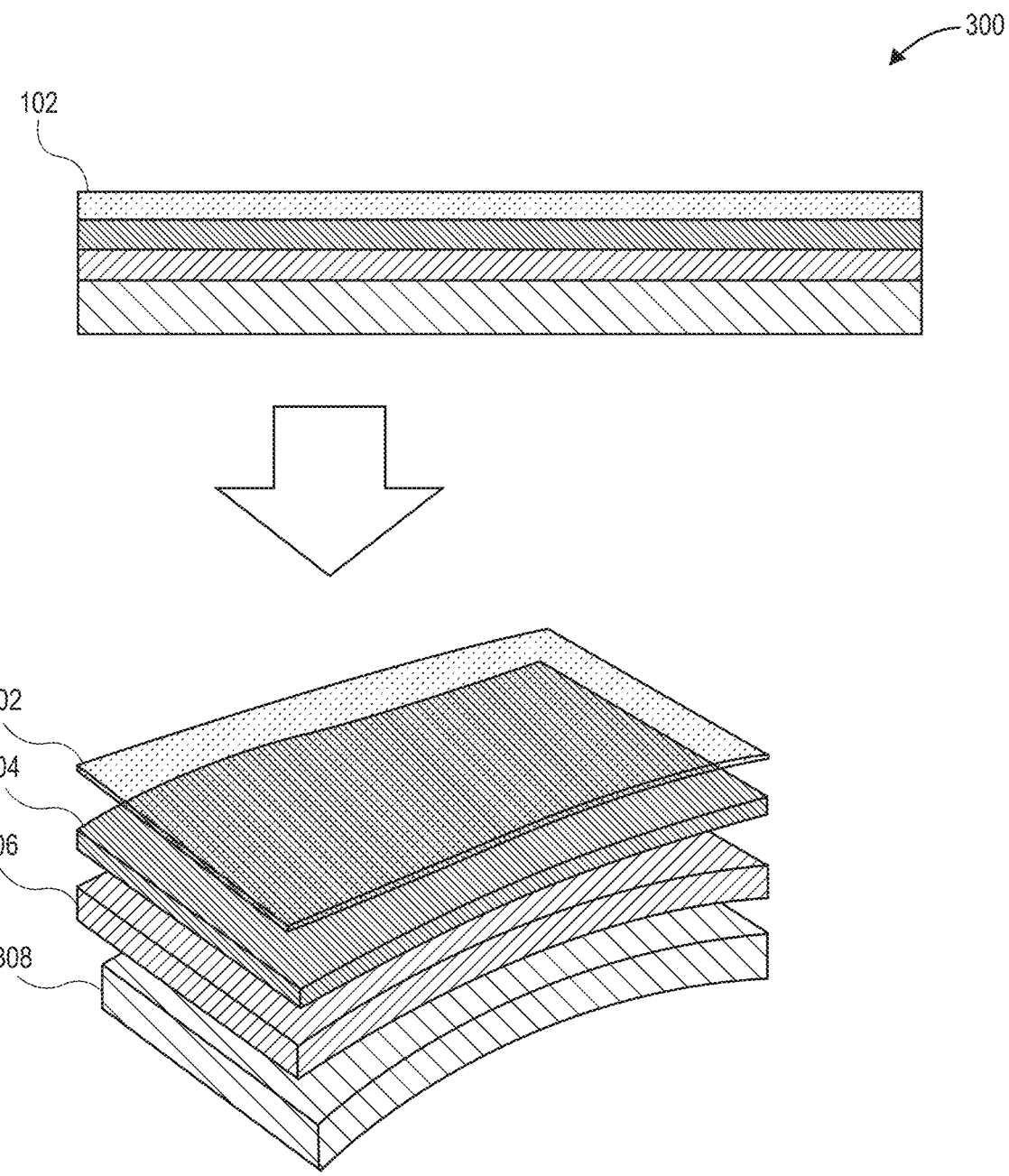
FIG. 3 is a schematic diagram of illustrative layers of an exemplary aerial vehicle landing pad, according to an implementation.

FIG. 3 is a schematic diagram of illustrative layers 300 of an exemplary aerial vehicle landing pad, according to an implementation. The landing pad may include a plurality of layers. The layers may include one or more layers for weatherproofing, packaging, and protection of internal components (possibly other layers). The landing pad may include layers of sensors. Additional layers may provide padding, firmness, support, or other structural attributes.

In accordance with various embodiments, a first layer, which may be a top layer that touches the aerial vehicle during landing, may include a rugged water-resistant material designed to protect the internal components of the landing pad (e.g., sensors, etc.) and create a landing pad that is weather resistant and resistant to damage and wear from repeat landings of aerial vehicles on the landing pad. For example, the first layer 302 is selected to withstand thousands of landings of aerial vehicles without tearing or otherwise having a failure of integrity of the first layer. The first layer may include indicia (e.g., markings on an outside and viewable from above the assembled landing pad) such as the target location, the reference points, and/or a border.

A second layer 304 may include a pressure sensor grid designed to generate pressure signals corresponding to specific locations of elements on the pressure sensor grid. The second layer 304 may be used to determine the engaged elements 242 described with reference to FIG. 2D.

A third layer 306 may include a force sensor grid designed to capture the absorbed force created by landing of the aerial vehicle on the landing pad as force signals corresponding to specific locations of elements on the force sensor grid. The force of the aerial vehicle may travel through the first layer and any intervening layers to apply the force to the force sensor grid.

A fourth layer 308 may include a base material that may function as a base structure of the landing pad. The fourth layer 308 may be designed to endure weather conditions and handling, shipping, storage, and use of the landing pad. The fourth layer 308 may be similar to the first layer 302. The fourth layer 308 may couple to the first layer 302 to securely enclose and/or protect the intervening layers (e.g., the second layer 304 and the third layer 306) from weather and/or other wear and tear.

Additional layers may be included in some embodiments, such as layers that provide structure, cushioning, insulation, and/or other features. The internal layers, such as the second layer 304 and third layer 306 may be arranged in any order. For example, the order of layers may include the third layer 306 on top of the second layer 304 and adjacent to the first layer 302. The order of layers from top to bottom may be: (1) first layer 302, second layer 304, third layer 306, and fourth layer 308; (2) first layer 302, third layer 306, second layer 304, and fourth layer 308; etc., plus any intervening additional layers. In some embodiments, the second layer 304 or the third layer 306 may be omitted.

In accordance with various embodiments, the pressure sensor grid and/or the force sensor grid may be sectioned into elements (e.g., quadrants) with the sensor located at a center or near a center of each element. For example, the pressure sensor may be a flat pressure activated sensor centered in a square element, or an element of a different shape based on a design preference. The size of elements may be about 6 inches across or smaller than 6 inches, but selection of size may be influenced by a desired granularity of measuring locations on the grid to create the graphical footprint, for example. However, other sensor configurations may be used, such as a configuration described below with reference to FIG. 6.

Figure 4:
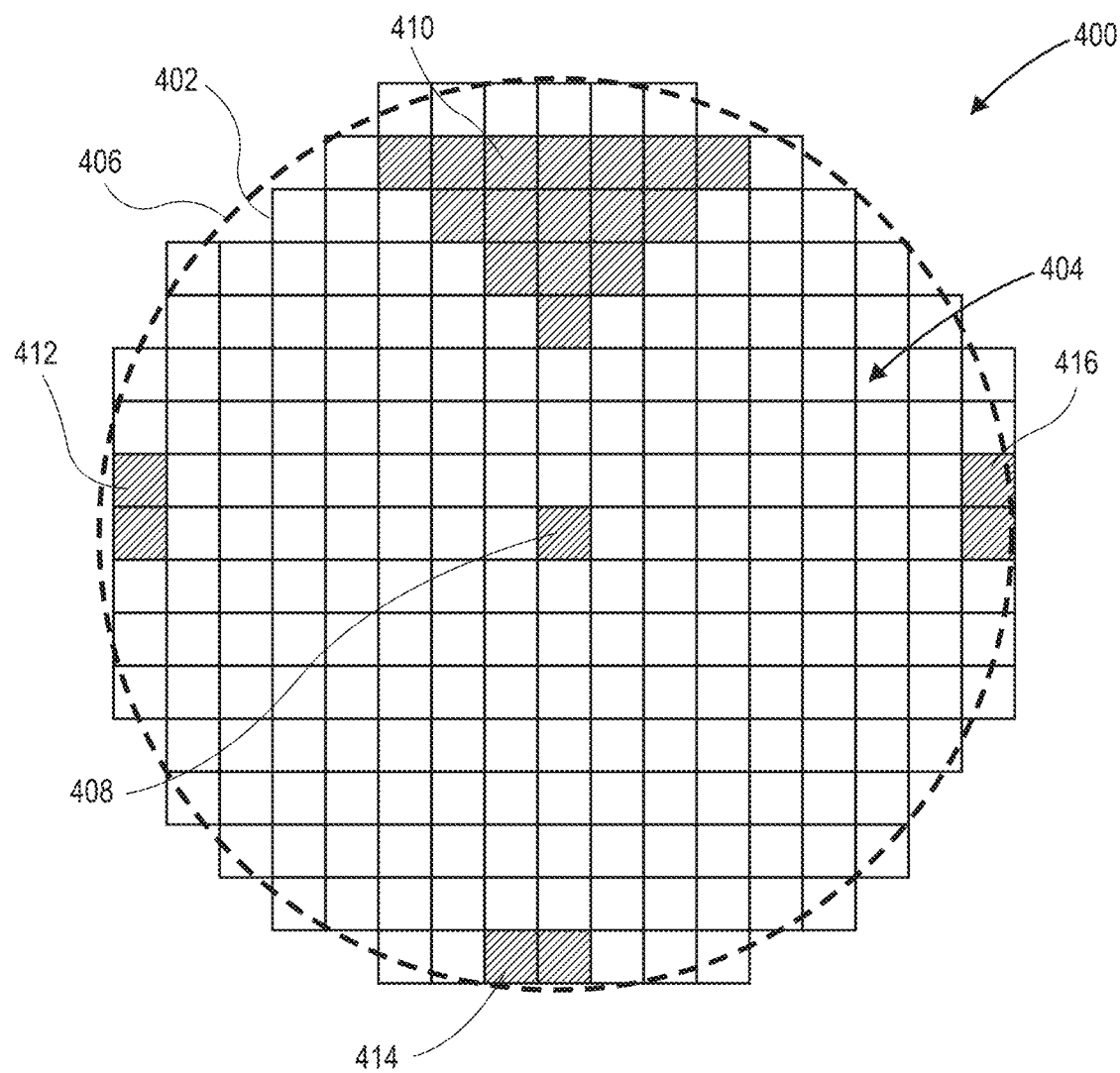
FIG. 4 is a schematic diagram of another illustrative aerial vehicle landing pad, according to an implementation.

FIG. 4 is a schematic diagram of another illustrative aerial vehicle landing pad 400 (or "landing pad 400"), according to an implementation. The landing pad 400 may include a plurality of elements 404 that form a grid 402. The grid may have a substantially circular profile 406 such that a border of the landing pad 400 is substantially a same distance to a center of the landing pad 400. The landing pad 400 may include various indicia, which may include a target landing location 408, reference points 410, a border, and/or other information for use to guide landing of the aerial vehicle on the landing pad 400 (e.g., by the human operator, by a visual landing system, etc.), used to reference a landing location and/or orientation of the aerial vehicle on the landing pad 400, and/or used for other reasons discussed herein. The border may include a first border marker 412, a second border marker 414, and a third border marker 416, that along with the reference points 410, define a general border or perimeter of the landing pad 400. The landing pad 400 may otherwise be similar to the landing pad 102 described with refence to FIGS. 2A-2F and may include the layers as described with reference to FIG. 3.

Figure 5:
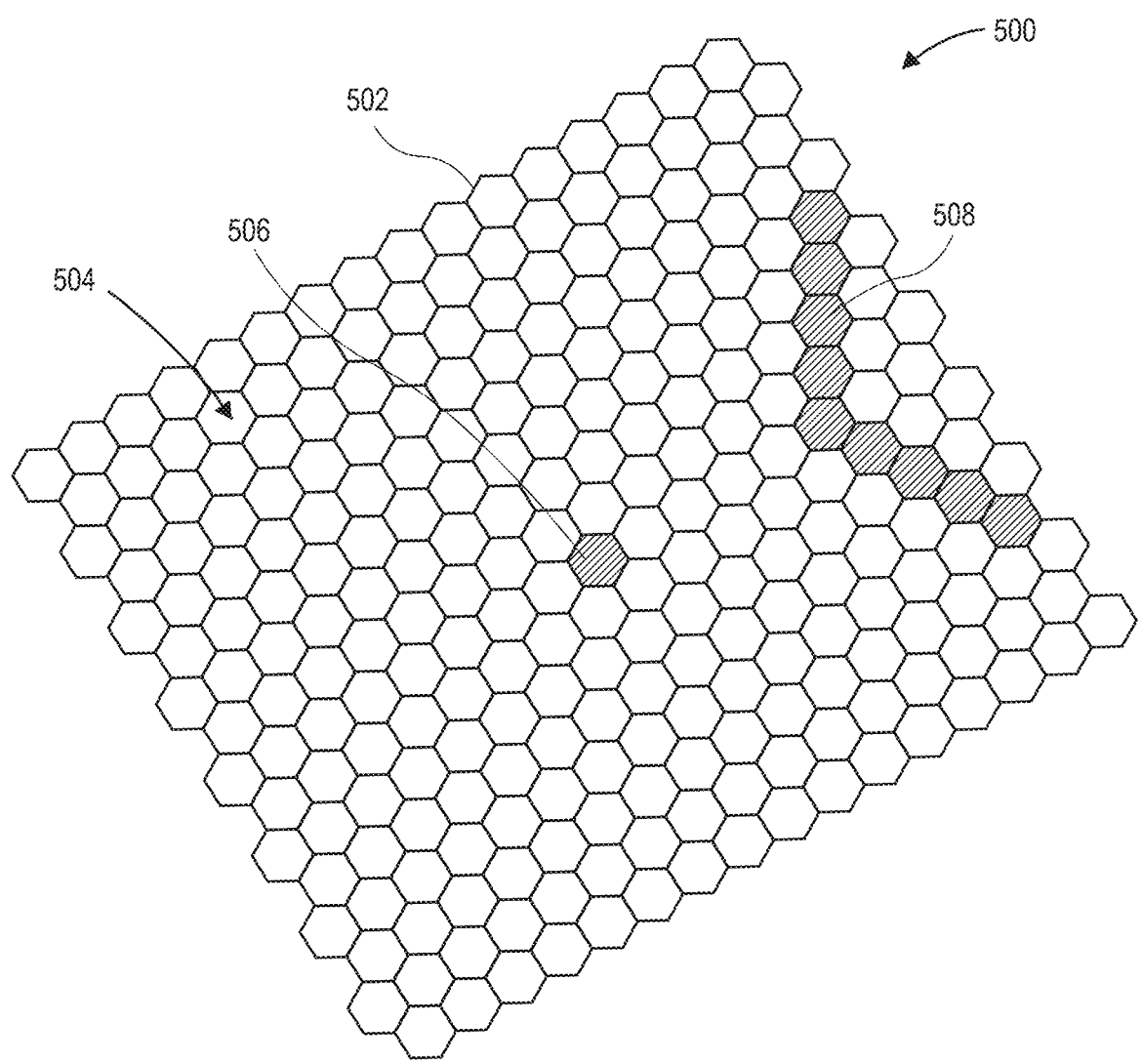
FIG. 5 is a schematic diagram of yet another illustrative aerial vehicle landing pad, according to an implementation.

FIG. 5 is a schematic diagram of yet another illustrative aerial vehicle landing pad 500, (or "landing pad 500"), according to an implementation. The landing pad 500 may include a plurality of elements 504 that form a grid 502. The elements 504 may include a hexagon profile. The elements 504 may be continuous across the grid and orientated in a side-by-side manner to create a continuous grid of sensors. The grid may have a rectangular profile, a substantially circular profile, a hexagon profile, or another substantially symmetric shape when viewed from above. The landing pad 500 may include various indicia, which may include a target landing location 506, reference points 508, a border, and/or other information for use to guide landing of the aerial vehicle on the landing pad 500 (e.g., by the human operator, by a visual landing system, etc.), used to reference a landing location and/or orientation of the aerial vehicle on the landing pad 500, and/or used for other reasons discussed herein. The landing pad 500 may otherwise be similar to the landing pad 102 described with refence to FIGS. 2A-2F and may include the layers as described with reference to FIG. 3.

Figure 6:
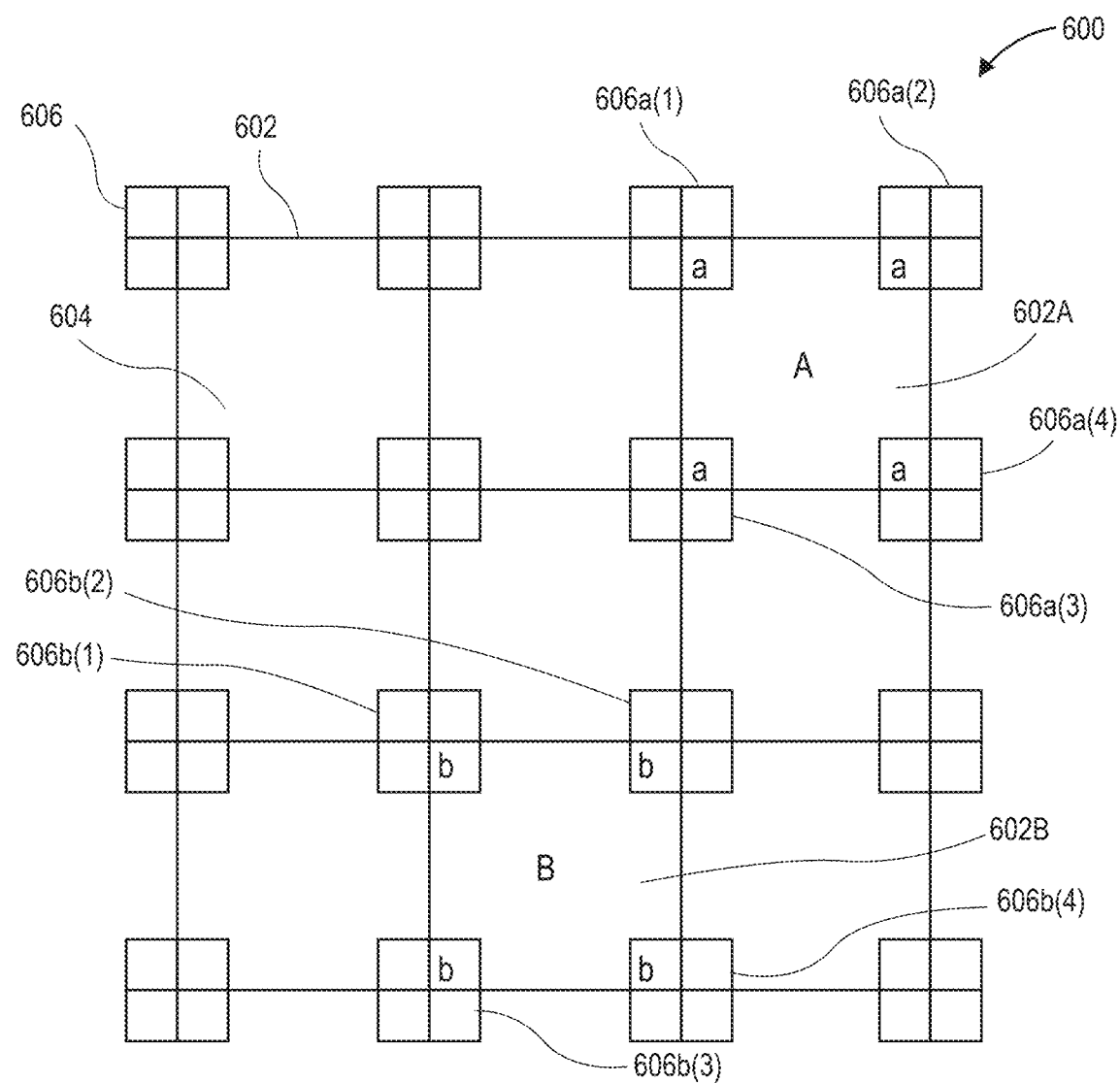
FIG. 6 is a schematic diagram of an illustrative sensor configuration for an aerial vehicle landing pad, according to an implementation.

FIG. 6 is a schematic diagram of an illustrative sensor configuration 600 for an aerial vehicle landing pad, according to an implementation. The sensor configuration 600 shows a grid 602 of elements 604. Although the grid 602 only shows nine elements, this depiction in FIG. 6 is only a subset of a full grid, which may contain many more elements. The elements are shown as rectangles (squares), but other shapes described herein may be used for the elements 604 and/or the grid 602.

The sensor configuration includes a plurality of sensors 606, which may be force sensors or pressure sensors, including other force or pressure sensing apparatus, such as load cells. The sensors 606 may be arranged around a perimeter of each element. A group of sensors (four in this example) support corners of each element. Therefore, when a force is applied to an element, each of the four sensors that support that element may generate a signal. Those signals may be aggregated to determine a signal or value for the element. As an example, a first element 602A may include sensors 606a(1), 606a(2), 606a(3), and 606a(4) that support the first element 602A. When a force is applied to the first element 602A, each of the sensors 606a(1), 606a(2), 606a(3), and 606a(4) generate signals. The signals may be aggregated to generate a first pressure value or a first force value for the first element 602A. Similarly, a second element 602B may include sensors 606b(1), 606b(2), 606b(3), and 606b(4) that support the second element 602B. When a force is applied to the second element 602B, each of the sensors 606b(1), 606b(2), 606b(3), and 606b(4) generate signals. The signals may be aggregated to generate a second pressure value or a second force value for the second element 602A. The elements 604 may be spaced apart on the grid 602 such that two landing structures of an aerial vehicle do not engage adjacent elements on the grid 602. The sensors 606 may also support adjacent elements. Using this shared configuration, the total number of sensors may be reduced as compared to a configuration where each element has dedicated sensors that do not support adjacent elements. However, in some embodiments, the elements may have dedicated sensors to support each element, such as one or more sensors for each element.

Figure 7:
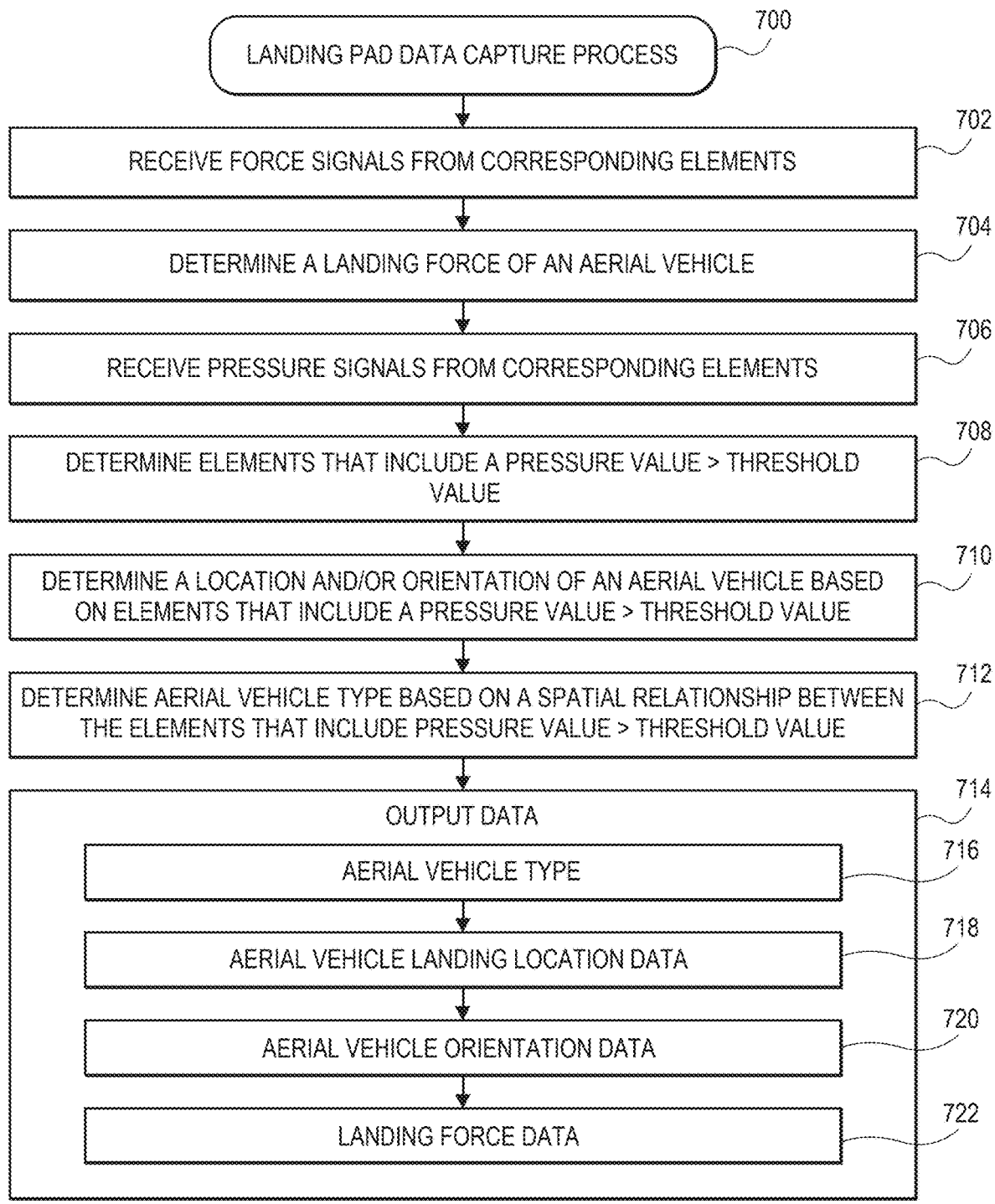
FIG. 7 is a flow diagram of an example process to collect and use sensor data from an aerial vehicle landing pad, according to an implementation.

FIG. 7 is a flow diagram of an example process 700 to collect and use sensor data from an aerial vehicle landing pad, according to an implementation. The example process of FIG. 7 and each of the other processes and sub-processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation and any number of the described operations can be combined in any order and/or in parallel to implement the routine. Likewise, one or more of the operations may be considered optional. Various operations from different processes may be combined in accordance with various embodiments.

The process 700 may begin by receiving force signals from corresponding elements, as in 702. For example, in response to an aerial vehicle landing on a landing pad, such as the landing pad 102 shown in FIG. 2A, the landing structures of the aerial vehicle may apply force to some of the elements of the grid of the landing pad. Those elements may include one or more force sensors that generate force signals in response to the applied force. The force signals may be transmitted via a wired connection to a sensor hub, which in turn may be in communication with a computing device that receives the force signals and locations of elements associated with those force signals.

A landing force of the aerial vehicle may be calculated or otherwise determined based on the force signals from the operation 702, as in 704. The landing force may be calculated as a single value representative of the aggregate force, as force components (e.g., force for each point of contact), or both. In some embodiments, the force signals may also be used to determine characteristics of a landing or other information based on a distribution of forces measured by the various elements that interact with the aerial vehicle during landing. For example, if the aerial vehicle includes three landing structures (e.g., legs) and those landing structures exert a force on three corresponding elements, each element may generate a force signal as {element 1, F1}, {element 2, F2}, and {element 3, F3}. If the values for F1, F2, and F3 are similar, then the aerial vehicle has landed relatively level. However, if one of the values F1, F2, and F3 is significantly greater than other force values (e.g., a factor of 50% greater, etc.), than the aerial vehicle has not landed relatively level, but instead has landed primarily on a single landing structure, which in turn generated a greater force on both that single landing structure and the corresponding element under that landing structure during landing.

The process 700 may receive pressure signals from corresponding elements of the grid of the landing pad, as in 706. For example, after an aerial vehicle lands on a landing pad, such as the landing pad 102 shown in FIG. 2A, the landing structures of the aerial vehicle may apply pressure to some of the elements of the grid of the landing pad. Those elements may include one or more pressure sensors that generate pressure signals in response to the applied pressure of the landing structures applied to the elements of the grid. The pressure signals may be transmitted via a wired connection to the sensor hub, which in turn may be in communication with a computing device that receives the pressure signals and locations of elements associated with those pressure signals.

The elements that include a pressure value that is greater than a threshold value may be determined, as in 708. The threshold value may be any value other than zero. In some embodiments, the threshold value may be set to a value greater than a nominal value to reduce or eliminate false positive readings that would otherwise indicate pressure applied to an element (e.g., such as pressure caused by artifacts or other occurrences and not from pressure from support structures of an aerial vehicle). The elements determined at the operation may be referred to as engaged elements, such as the engaged elements 242 described with reference to FIG. 2D.

A location and/or an orientation of the aerial vehicle on the landing pad may be determined based on the pressure elements that include a pressure value greater than the threshold value (i.e., the engaged elements), as in 710. For example, the location may be determined as a centroid of the location of the engaged elements, or from another reference location associated with the engaged elements. The orientation may be determined based on the spatial configuration of the elements of the engaged elements. For example, when the engaged elements include three elements and the elements spatially form a triangle, a point of that triangle may indicate the orientation of the aerial vehicle assuming the triangle is not an equilateral triangle.

A type of aerial vehicle on the landing pad may be determined based on the pressure elements that include a pressure value greater than the threshold value (i.e., the engaged elements), as in 712. For example, the spatial configuration of the elements of the engaged elements may be compared to reference configurations that are associated with different types of aerial vehicles. The landing structures of the aerial vehicles may be designed such that each type of aerial vehicle has a unique footprint captured by the spatial configuration of elements of the engaged elements.

The process 700 may output data for at least some of the operations described above, as in 714. For example, the landing pad application 130 may perform at least some of the operations 702 to 712 and may output the output data 132 as described with reference to FIG. 1.

The output may include an aerial vehicle type, as in 716. The aerial vehicle type may be associated with specifications of the corresponding aerial vehicle.

The output may include aerial vehicle landing location data, as in 718. The aerial vehicle landing location data may be a centroid of the engaged elements or other reference point representative of the landing location. The landing location may be compared to a target location indicated on the landing pad. A deviation from the landing location to the target location may be determined and may be included as an output.

The output may include orientation data, as in 720. The orientation data may be provided in reference to a reference direction indicated on the landing pad. For example, the orientation may be expressed as a degree of rotation relative to a direction indicated on the landing pad.

The output may include landing force data, as in 722. The landing force may include an aggregate force, individual forces for each of the engaged elements, or both.

Figure 8:
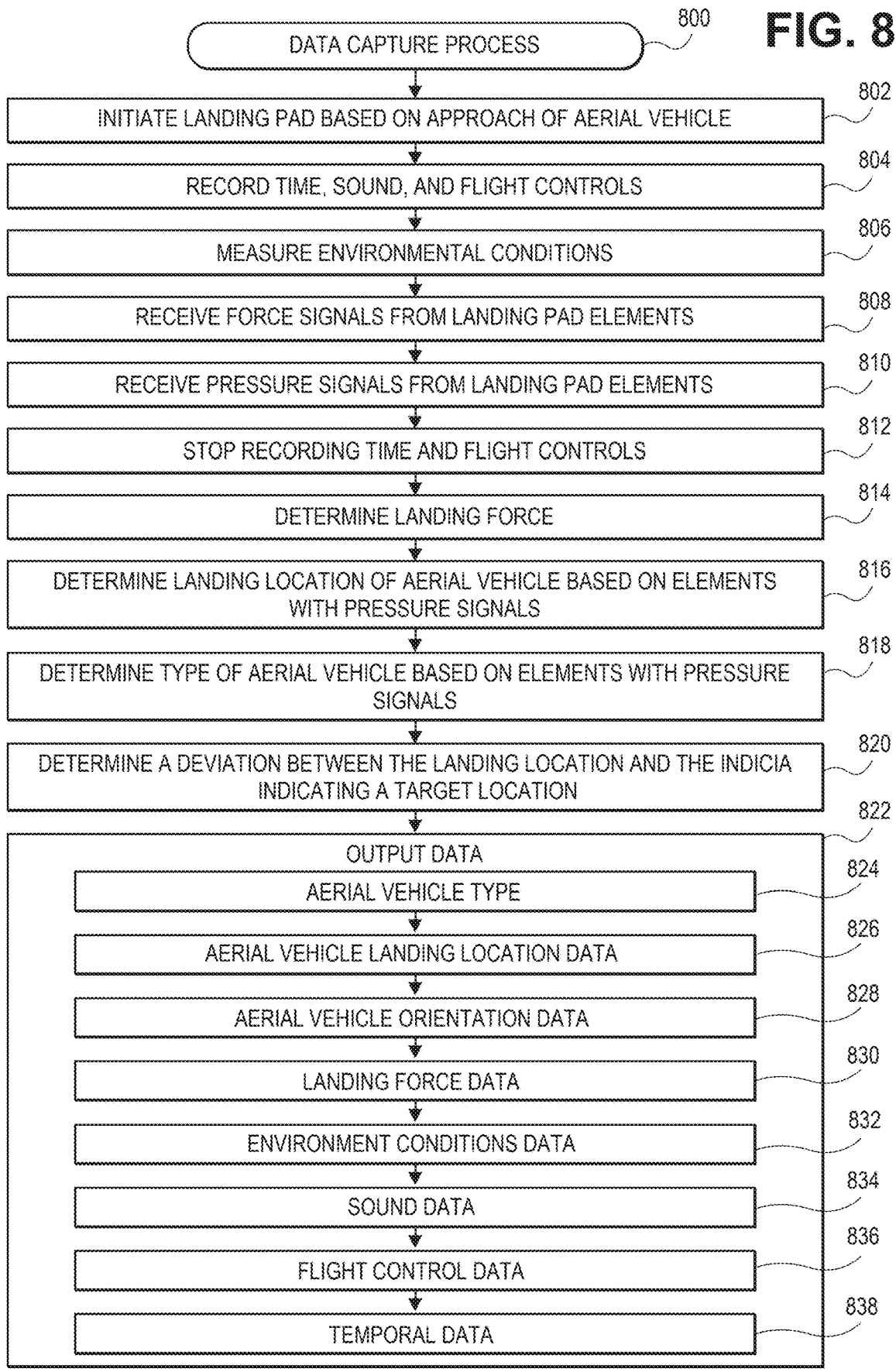
FIG. 8 is a flow diagram of another example process to collect and use sensor data from an aerial vehicle landing pad, according to an implementation.

FIG. 8 is a flow diagram of another example process 800 to collect and use sensor data from an aerial vehicle landing pad, according to an implementation. The process 800 may begin by initiating a landing pad on approach of an aerial vehicle, as in 802. A time, sound signals captured by a microphone, and/or flight controls issued to the aerial vehicle, such as by a human operator that controls landing of the aerial vehicle, may be recorded, as in 804. The recording may be initiated based on an initiation of control by the human operator that takes over from autonomous control of the aerial vehicle. The recording may be initiated based on a distance of the aerial vehicle from the landing pad. The recording may be initiated based on other events.

Environmental conditions may be measured using the environmental sensors, as in 806. For example, environmental conditions such as temperature, humidity, barometric pressure, windspeed, precipitation, and/or other environmental conditions that may impact flight of the aerial vehicle may be measured. The environmental conditions may be captured as signals from the environmental sensors, which may be received by the sensor hub of the landing pad.

Force signals may be received from corresponding elements, as in 808. For example, in response to an aerial vehicle landing on a landing pad, such as the landing pad 102 shown in FIG. 2A, the landing structures of the aerial vehicle may apply force to some of the elements of the grid of the landing pad. Those elements may include one or more force sensors that generate force signals in response to the applied force. The force signals may be transmitted via a wired connection to a sensor hub, which in turn may be in communication with a computing device that receives the force signals and locations of elements associated with those force signals.

The process 800 may receive pressure signals from corresponding elements of the grid of the landing pad, as in 810. For example, after an aerial vehicle lands on a landing pad, such as the landing pad 102 shown in FIG. 2A, the landing structures of the aerial vehicle may apply pressure to some of the elements of the grid of the landing pad. Those elements may include one or more pressure sensors that generate pressure signals in response to the applied pressure of the landing structures applied to the elements of the grid. The pressure signals may be transmitted via a wired connection to the sensor hub, which in turn may be in communication with a computing device that receives the pressure signals and locations of elements associated with those pressure signals.

The recording of the time and flight controls from the operation 804 may be terminated, as in 812. In some embodiments, the time may be captured as a start time at the operation 804 and as an end time at the operation 812 to determine a total time for the landing operation. In various embodiments, the flight controls may be transmitted to a computing device for all controls issued and/or executed by the aerial vehicle during the landing operation (e.g., between the start time from the operation 804 to the end time from the operation 812). In various embodiments, the operation 812 may be initiated by a sound level being less than a threshold sound level as indicated by sound signals captured via the operation 804.

A landing force of the aerial vehicle may be calculated or otherwise determined based on the force signals from the operation 808, as in 814. The landing force may be calculated as a single value representative of the aggregate force, as force components (e.g., force for each point of contact), or both. In some embodiments, the force signals may also be used to determine characteristics of a landing or other information based on a distribution of forces measured by the various elements that interact with the aerial vehicle during landing.

A location and/or an orientation of the aerial vehicle on the landing pad may be determined based on the pressure elements that provide a pressure signal (i.e., the engaged elements), as in 816. For example, the location may be determined as a centroid of the location of the engaged elements, or from another reference location associated with the engaged elements. The orientation may be determined based on the spatial configuration of the elements of the engaged elements. For example, when the engaged elements include three elements and the elements spatially form a triangle, a point of that triangle may indicate the orientation of the aerial vehicle assuming the triangle is not an equilateral triangle.

A type of aerial vehicle on the landing pad may be determined based at least in part on the pressure elements that include a pressure signal (i.e., the engaged elements), as in 818. For example, the spatial configuration of the elements of the engaged elements may be compared to reference configurations that are associated with different types of aerial vehicles. In some embodiments, additional or alternative information may be used to determine a type of aerial vehicle, including a weight (e.g., derived from pressure signals), radio communications from the aerial vehicle, optical communications from the aerial vehicle, and/or other information captured by the landing pad during a landing operation. The landing structures of the aerial vehicles may be designed such that each type of aerial vehicle has a unique footprint captured by the spatial configuration of elements of the engaged elements.

A deviation between the landing location from the operation 816 and a target location may be determined, as in 820. The deviation may be an offset of the landing location from the target location. The target location may be a desired location for the landing location, and the deviation may account for error in landing, environmental conditions, and/or other physical or control related outcomes.

The process 800 may output data for at least some of the operations described above, as in 822. For example, the landing pad application 130 may perform at least some of the operations 802 to 820 and may output the output data 132 as described with reference to FIG. 1.

The output may include an aerial vehicle type, as in 824. The aerial vehicle type may be associated with specifications of the corresponding aerial vehicle.

The output may include aerial vehicle landing location data, as in 826. The aerial vehicle landing location data may be a centroid of the engaged elements or other reference point representative of the landing location. The landing location may be compared to a target location indicated on the landing pad. A deviation from the landing location to the target location may be determined and may be included as an output.

The output may include orientation data, as in 828. The orientation data may be provided in reference to a reference direction indicated on the landing pad. For example, the orientation may be expressed as a degree of rotation relative to a direction indicated on the landing pad.

The output may include landing force data, as in 830. The landing force may include an aggregate force, individual forces for each of the engaged elements, or both.

The output may include environmental conditions data, as in 832. The environmental conditions data may include a windspeed, temperature, barometric pressure, humidity, precipitation, and/or other environmental conditions that may impact a landing of the aerial vehicle on the landing pad and possibly account for the landing location and/or the force of the landing.

The output may include sound data, as in 834. In some embodiments, the sound data may be used to terminate the recording of data via the operation 812 and may indicate a level of sound at the landing pad. The sound data may also initiate further operations, such as retrieval of the aerial vehicle and/or changes to batteries and/or payload in response to the sound being less than a threshold, for example, among other possible indicator data that the aerial vehicle is powered down and ready for further tasks.

The output may include flight control data, as in 836. The flight control data may include controls provided by the human operator, controls executed by the aerial vehicle, or both.

The output may include temporal data, as in 838. The temporal data may include events and/or time stamps when the events occurred (e.g., landing started, landing complete), a total time for landing, and/or other temporal data.

Figure 9:
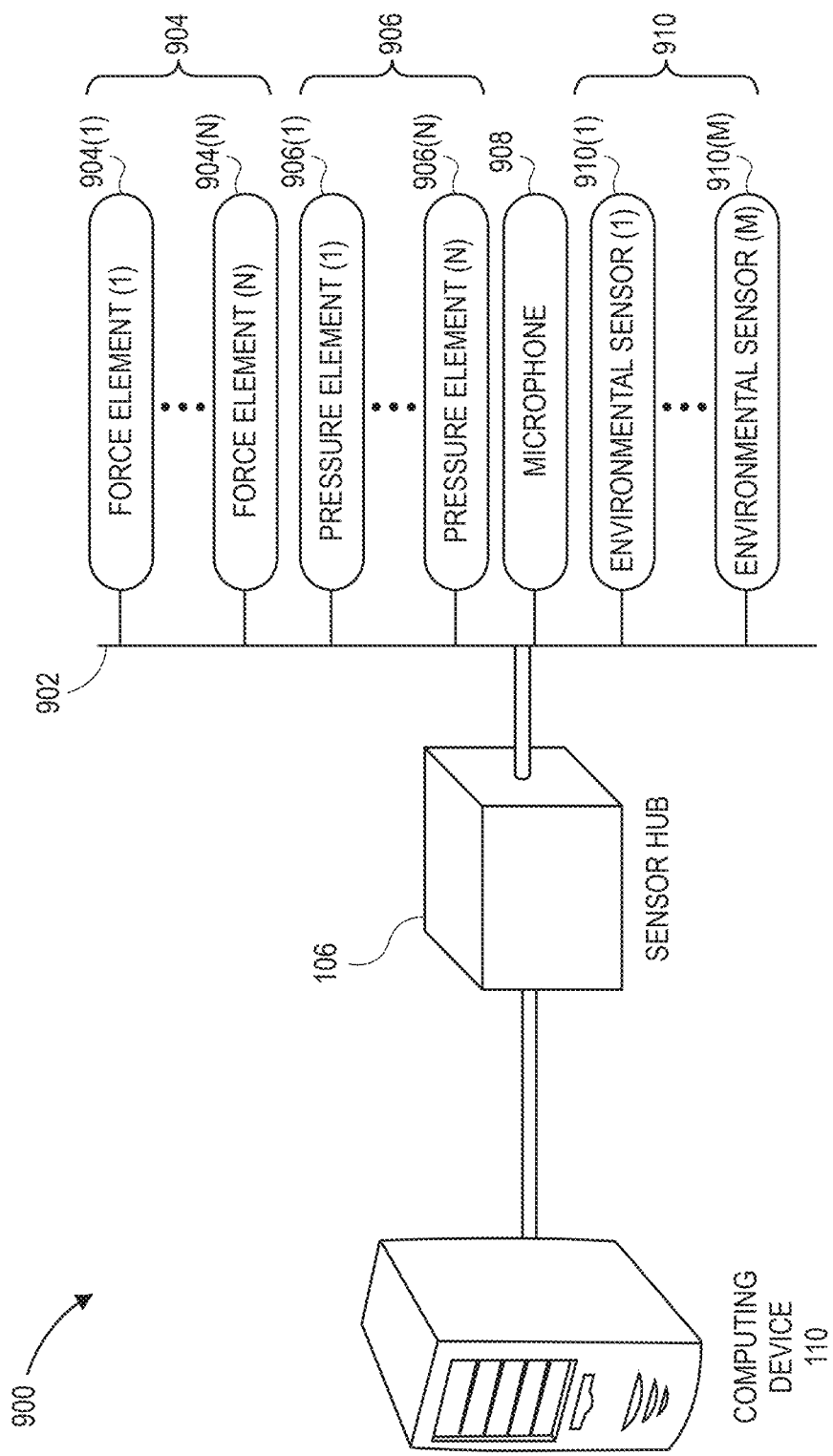
FIG. 9 is a schematic diagram of an illustrative sensor hub in communication with an aerial vehicle landing pad and a computing device, according to an implementation.

FIG. 9 is a schematic diagram of an illustrative sensor hub configuration 900 in communication with an aerial vehicle landing pad (e.g., the landing pad 102) and the computing device 110, according to an implementation. The sensor hub 106 may include a bus 902. The bus 902 may receive signals from each element of the grid. The bus 902 may receive force signals from force elements 904, such as a first force element 904(1) . . . to a last force element 904(N) included in the grid of elements. The bus 902 may receive pressure signals from pressure elements 906, such as a first pressure element 906(1) . . . to a last pressure element 906(N) included in the grid of elements. The bus 902 may receive one or more signals from a microphone 908. The bus 902 may receive signals from environmental sensors 910, such as a first environmental sensors 910(1) . . . to a last environmental sensors 910(M) included proximate to the grid of elements.

Figure 10:
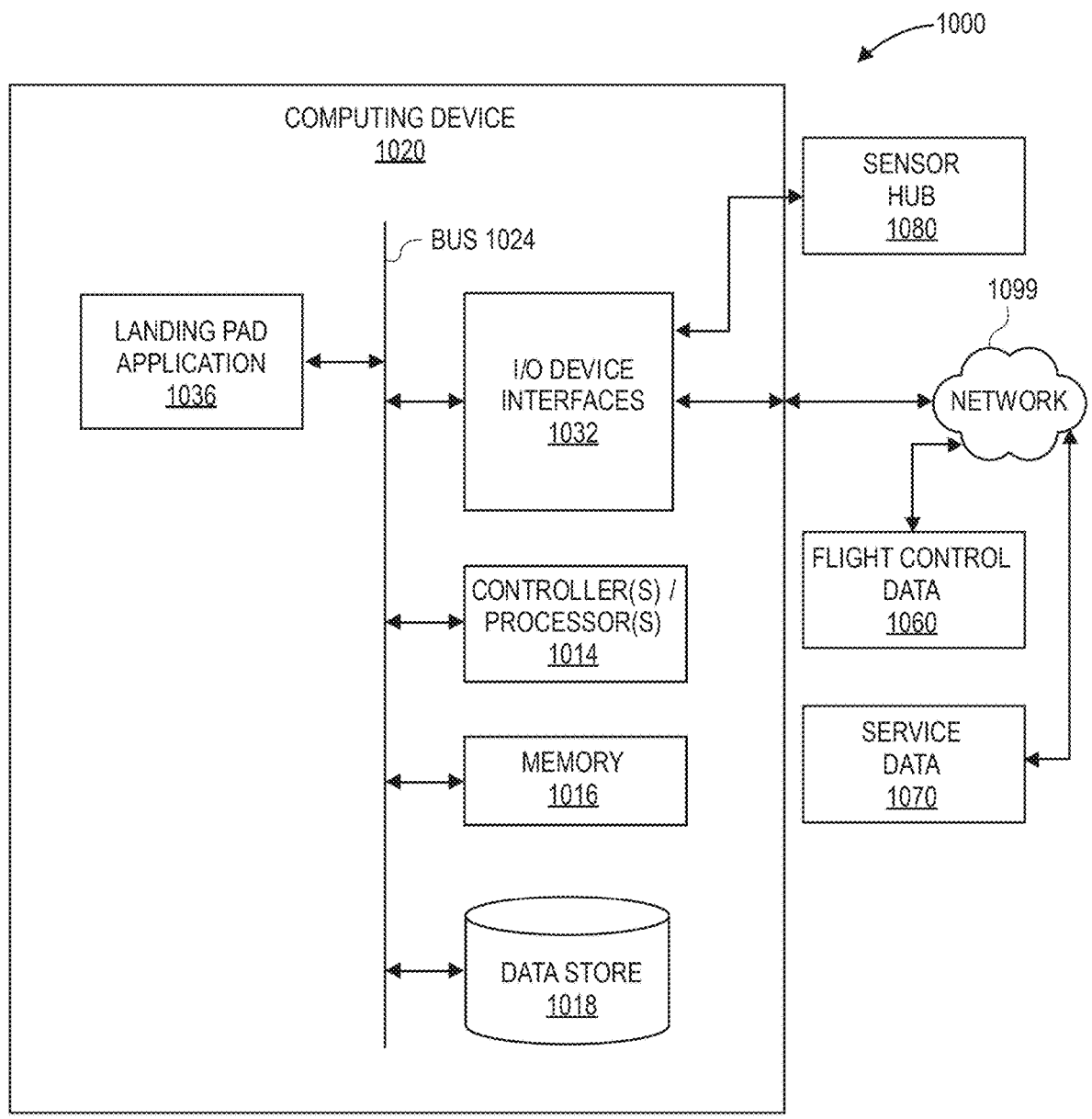
FIG. 10 is a block diagram of an illustrative implementation of a computing device that may be used with various implementations.

FIG. 10 is a block diagram conceptually illustrating example components 1000 of a computing device 1020 that may include and/or execute one or more of the above discussed implementations. The computing device 1020 may be representative of one or more configurations of the computing device 110 described with reference to FIG. 1.

The computing device 1020 may include one or more controllers/processors 1014, that may each include a central processing unit (CPU) for processing data and computer-readable instructions, and a memory 1016 for storing data and instructions. The memory 1016 may individually include volatile random access memory (RAM), non-volatile read only memory (ROM), non-volatile magnetoresistive random access memory (MRAM) and/or other types of memory. The computing device 1020 may also include a data store 1018 for storing data, controller/processor-executable instructions, customer data, order data, historical delivery data, images, mapping data, etc. Each data storage component may individually include one or more non-volatile storage types such as magnetic storage, optical storage, solid-state storage, etc. The computing device 1020 may also be connected to removable or external non-volatile memory and/or storage (such as a removable memory card, memory key drive, networked storage, etc.), internal, and/or external networks 1099 (e.g., the Internet) through respective input/output device interfaces 1032.

Computer instructions for operating the computing device 1020 and its various components may be executed by the controller(s)/processor(s) 1014, using the memory 1016 as temporary "working" storage at runtime. Computer instructions may be stored in a non-transitory manner in non-volatile memory 1016, storage 1018, and/or an external device(s). Alternatively, some or all of the executable instructions may be embedded in hardware or firmware on the respective device in addition to or instead of software.

The computing device 1020 includes input/output device interfaces 1032. A variety of components may be connected through the input/output device interfaces. Additionally, the computing device 1020 may include an address/data bus 1024 for conveying data among components of the computing device. Each component within the computing device 1020 may also be directly connected to other components in addition to (or instead of) being connected to other components across the bus 1024. The computing device 1020 may include a landing pad application 1036 (e.g., the landing pad application 130 described in reference to FIG. 1), which may include some or all of the functionality to perform the operations described with reference to FIGS. 7 and 8. The computing device 1020 may be in communication with flight control data 1060 and/or service data 1070, as shown and described with reference to FIG. 1. The sensor hub 1080 may be in communication with the input/output device interfaces 1032 to provide the signals of the landing pad to the landing pad application 1036.

The components of the computing device 1020, as illustrated in FIG. 10, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 7 and 8, orders in which such methods or processes are presented are not intended to be construed as any limitation on the claimed inventions, and any number of the method or process steps or boxes described herein can be combined in any order, in parallel, and/or be omitted to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A system, comprising:
an aerial vehicle landing pad including:
a plurality of elements, each element including at least a pressure sensor and a force sensor configured to measure physical interaction with an aerial vehicle during and after landing of the aerial vehicle on the aerial vehicle landing pad, the plurality of elements arranged in a grid, wherein an individual element of the plurality of elements further includes:
a first layer including a water resistant material and indicia indicating at least a target landing location on the grid;
a second layer including the pressure sensor configured to output a pressure signal in response to pressure applied to a portion of the second layer;
a third layer coupled to the second layer, the third layer comprising the force sensor configured to output a force signal in response to force applied to a portion of the third layer; and
a fourth layer coupled to a perimeter of the first layer, the fourth layer including a water resistant material forming a protective base; and
a sensor hub coupled to each of the plurality of elements, wherein each of the plurality of elements is configured to output the pressure signal and the force signal via the sensor hub for a corresponding element at least in response to detection of a force applied to the corresponding element during landing of the aerial vehicle;
one or more processors in communication with the sensor hub; and
a memory storing program instructions that, when executed by the one or more processors, cause the one or more processors to at least:
receive force signals and pressure signals from the sensor hub;
determine a landing location of the aerial vehicle on the aerial vehicle landing pad based at least in part on a location of elements in the grid that indicate a received pressure signal greater than a threshold pressure value; and determine a landing force for the aerial vehicle based at least in part on the force signals; and output at least the landing location and the landing force.

2. The system of claim 1, wherein the program instructions that when executed by the one or more processors further cause the one or more processors to at least:

determine a version of the aerial vehicle based at least in part on the location of elements in the grid that indicate the pressure signal greater than the threshold pressure value; and output the version of the aerial vehicle.

3. The system of claim 1, wherein the program instructions that when executed by the one or more processors further cause the one or more processors to at least:

determine that the aerial vehicle is within a threshold distance from the aerial vehicle landing pad;

initiate recording of flight controls issued to the aerial vehicle during a landing operation on the aerial vehicle landing pad; and output at least a portion of the flight controls.

4. The system of claim 1, wherein the aerial vehicle landing pad further includes at least one microphone; and the program instructions that when executed by the one or more processors further cause the one or more processors to at least:

initiate recording of signals from the microphone of sound of the aerial vehicle during landing on the aerial vehicle landing pad; and output at least a value indicating an intensity of the sound of the aerial vehicle.

5. The system of claim 1, wherein:

the aerial vehicle landing pad further includes at least one environmental sensor to measure an environmental condition proximate to the aerial vehicle landing pad; and the program instructions that when executed by the one or more processors further cause the one or more processors to at least:

initiate recording of the at least one environmental condition within a threshold time of an approach of the aerial vehicle to the aerial vehicle landing pad; and output the at least one environmental condition.

6. The system of claim 1, wherein the program instructions that when executed by the one or more processors further cause the one or more processors to at least:

determine orientation of the aerial vehicle on the grid based on the location of elements in the grid that indicate the pressure signal greater than the threshold pressure value;

determine a deviation between the landing location of the aerial vehicle and indicia on the aerial vehicle landing pad indicating a target location; and output the orientation and the deviation.

7. The system of claim 1, wherein the program instructions that when executed by the one or more processors further cause the one or more processors to at least:

determine a first time when the aerial vehicle is a threshold distance from the aerial vehicle landing pad;

determine a second time in response to the pressure values indicating presence of the aerial vehicle on the aerial vehicle landing pad;

determine an elapsed time to land the aerial vehicle as a difference between the second time and the first time; and output the elapsed time as indicating a time to land the aerial vehicle on the aerial landing pad.

8. An apparatus, comprising:

an aerial vehicle landing pad including a plurality of elements, individual elements of the plurality of elements including at least a pressure sensor and a force sensor configured to measure physical interaction with an aerial vehicle during and after landing of the aerial vehicle on the aerial vehicle landing pad, the plurality of elements arranged in a grid, wherein an individual element of the plurality of elements further includes:

a first layer including a water resistant material and indicia indicating at least a target landing location on the grid;

a second layer including the pressure sensor configured to output a pressure signal in response to pressure applied to a portion of the second layer;

a third layer coupled to the second layer, the third layer comprising the force sensor configured to output a force signal in response to force applied to a portion of the third layer; and a fourth layer coupled to a perimeter of the first layer, the fourth layer including a water resistant material forming a protective base; and a sensor hub coupled to the plurality of elements, wherein individual elements of the plurality of elements are configured to output the pressure signal and the force signal via the sensor hub for a corresponding element at least in response to detection of a force applied to the corresponding element during landing of the aerial vehicle.

9. The apparatus of claim 8, wherein:

the plurality of elements are square-shaped and arranged side-by-side to form the grid.

10. The apparatus of claim 8, wherein:

the first layer, the second layer, the third layer, and the fourth layer are comprised of a flexible substrate that is configured to be folded during transport or storage of the landing pad.

11. The apparatus of claim 8, wherein:

the fourth layer forms a substantially rigid base, and the first layer covers at least some sides of the second and the third layer to couple with the fourth layer.

12. The apparatus of claim 8, further comprising:

one or more environmental measuring instruments including at least one of a temperature sensor, a wind speed indicator, a barometer, or a precipitation measuring apparatus; and wherein the sensor hub is coupled to the one or more environmental measuring instruments.

13. The apparatus of claim 8, further comprising:

at least one microphone to capture sound produced by the aerial vehicle during the landing on the aerial vehicle landing pad; and wherein the sensor hub is coupled to the at least one microphone.

14. The apparatus of claim 8, further comprising:

the grid is arranged in a substantially circular shape as viewed from above the aerial vehicle landing pad.

15. A system, comprising:

an aerial vehicle landing pad including a plurality of elements, individual elements of the plurality of elements including at least a pressure sensor and a force sensor configured to measure physical interaction with an aerial vehicle during and after landing of the aerial vehicle on the aerial vehicle landing pad, the plurality of elements arranged in a grid, wherein an individual element of the plurality of elements further includes:

a first layer including a water resistant material and indicia indicating at least a target landing location on the grid;

a second layer including the pressure sensor configured to output a pressure signal in response to pressure applied to a portion of the second layer;

a third layer coupled to the second layer, the third layer comprising a force sensor configured to output the force signal in response to force applied to a portion of the third layer; and a fourth layer coupled to a perimeter of the first layer, the fourth layer including a water resistant material forming a protective base;

a sensor hub coupled to the plurality of elements, wherein the individual elements of the plurality of elements are configured to output the pressure signal and the force signal using the sensor hub for a corresponding element at least in response to detection of a force applied to the corresponding element during landing of the aerial vehicle;

one or more processors in communication with the sensor hub; and a memory storing program instructions that, when executed by the one or more processors, cause the one or more processors to at least:

receive force signals and pressure signals from the sensor hub;

determine a landing location of the aerial vehicle on the aerial vehicle landing pad based at least in part on a location of elements in the grid that indicate a received pressure signal greater than a threshold pressure value; and determine a landing force for the aerial vehicle based at least in part on the force signals; and output at least the landing location and the landing force.

16. The system of claim 15, wherein the program instructions that when executed by the one or more processors further cause the one or more processors to at least:

determine a version of the aerial vehicle based at least in part on the location of elements in the grid that indicate the pressure signal greater than the threshold pressure value; and output the version of the aerial vehicle.

17. The system of claim 15, wherein:

the aerial vehicle landing pad further includes at least one microphone; and the program instructions that when executed by the one or more processors further cause the one or more processors to at least:

initiate recording of signals from the microphone of sound of the aerial vehicle during landing on the aerial vehicle landing pad; and output at least a value indicating an intensity of the sound of the aerial vehicle.

18. The system of claim 15, wherein:

the aerial vehicle landing pad further includes at least one environmental sensor to measure an environmental condition proximate to the aerial vehicle landing pad; and the program instructions that when executed by the one or more processors further cause the one or more processors to at least:

initiate recording of the at least one environmental condition within a threshold time of an approach of the aerial vehicle to the aerial vehicle landing pad; and output the at least one environmental condition.

19. The system of claim 15, wherein the program instructions that when executed by the one or more processors further cause the one or more processors to at least:

determine orientation of the aerial vehicle on the grid based on the location of elements in the grid that indicate the pressure signal greater than the threshold pressure value;

determine a deviation between the landing location of the aerial vehicle and indicia on the aerial vehicle landing pad indicating a target location; and output the orientation and the deviation.

* * * * *